(12) United States Patent
Lombardini

(10) Patent No.: US 11,079,752 B1
(45) Date of Patent: Aug. 3, 2021

(54) UAV CONTROLLER DEVICE

(71) Applicant: Martin Lombardini, Franklin, TN (US)

(72) Inventor: Martin Lombardini, Franklin, TN (US)

( * ) Notice: Subject to any disclaimer, the term of this patent is extended or adjusted under 35 U.S.C. 154(b) by 189 days.

(21) Appl. No.: 16/553,841

(22) Filed: Aug. 28, 2019

Related U.S. Application Data

(60) Provisional application No. 62/724,697, filed on Aug. 30, 2018.

(51) Int. Cl.

| | |
|---|---|
| *B60L 53/30* | (2019.01) |
| *B60L 53/12* | (2019.01) |
| *B64D 7/00* | (2006.01) |
| *B64D 7/08* | (2006.01) |
| *H02J 7/02* | (2016.01) |
| *G05D 1/00* | (2006.01) |
| *B64C 39/02* | (2006.01) |
| *B64D 47/08* | (2006.01) |
| *B64F 1/36* | (2017.01) |
| *F41H 13/00* | (2006.01) |

(52) U.S. Cl.
CPC ............ *G05D 1/0016* (2013.01); *B60L 53/12* (2019.02); *B60L 53/30* (2019.02); *B64C 39/024* (2013.01); *B64D 7/00* (2013.01); *B64D 47/08* (2013.01); *B64F 1/364* (2013.01); *F41H 13/0018* (2013.01); *H02J 7/025* (2013.01); *B60L 2200/10* (2013.01); *B64C 2201/102* (2013.01); *B64C 2201/126* (2013.01); *B64C 2201/146* (2013.01); *B64C 2201/201* (2013.01)

(58) Field of Classification Search
None
See application file for complete search history.

(56) References Cited

U.S. PATENT DOCUMENTS

| | | | |
|---|---|---|---|
| 2009/0170395 A1* | 7/2009 | Wai | A63H 30/04 446/38 |
| 2014/0217242 A1* | 8/2014 | Muren | A63H 27/12 244/4 R |
| 2020/0027326 A1* | 1/2020 | Ravat | G08B 13/196 |
| 2020/0109944 A1* | 4/2020 | Zhang | G08G 5/0069 |
| 2020/0349853 A1* | 11/2020 | Speasl | B64C 39/024 |

* cited by examiner

*Primary Examiner* — Jared Fureman
*Assistant Examiner* — Aqeel H Bukhari
(74) *Attorney, Agent, or Firm* — PatentFile, LLC; Bradley C. Fach; Steven R. Kick

(57) ABSTRACT

An UAV controller device is provided. In some embodiments, the device may include a control panel having one or more user control inputs, and a processing unit may be in communication with the control inputs. A display screen may also be in communication with the processing unit. Optionally, the display screen may be movable between an open and a closed position. A side wall may be coupled to a proximal wall and to a distal wall, the side wall, proximal wall, and distal wall forming a storage compartment. The storage compartment may have a storage cavity for removably receiving a UAV, and the UAV may be in wireless communication with the processing unit. A camera, for recording video, may be coupled to the UAV. Video recorded by the camera may be displayed on the display screen, and one or more of the control inputs may govern movement of the UAV.

19 Claims, 24 Drawing Sheets

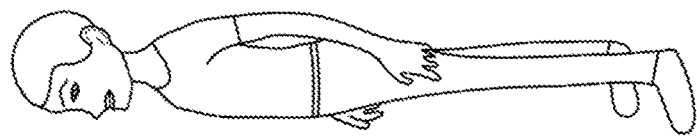
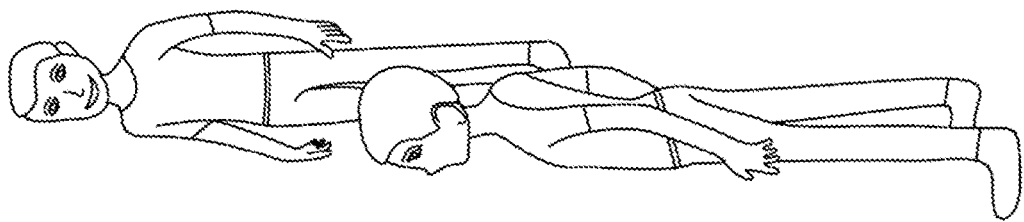
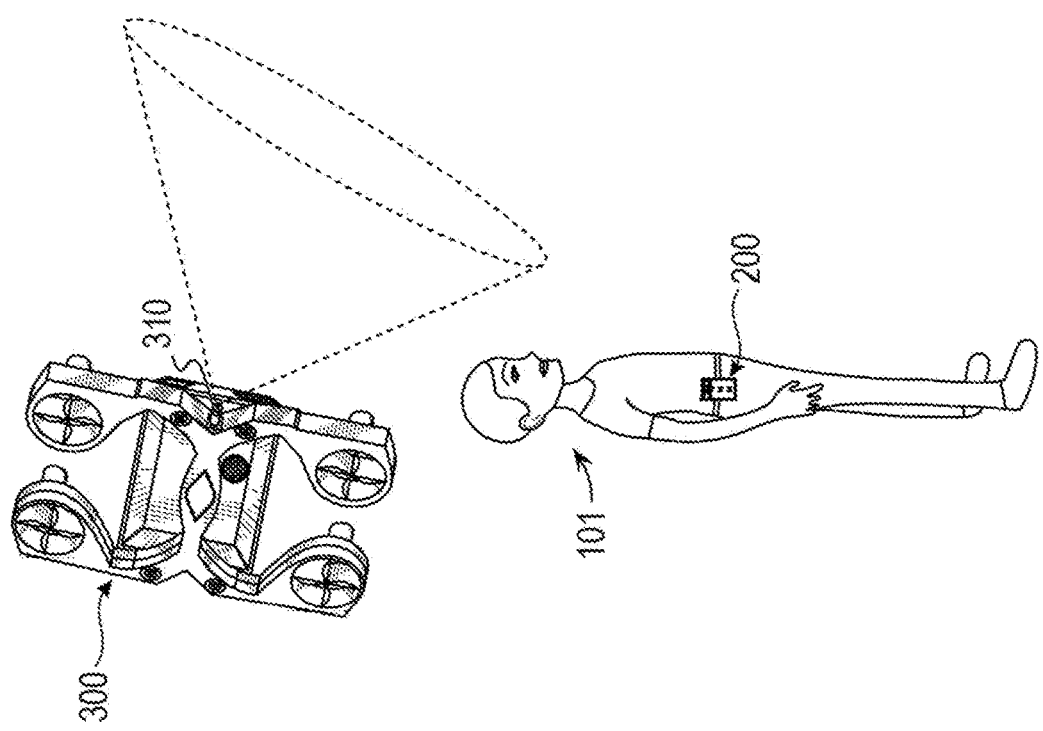
FIG. 9

UAV CONTROLLER DEVICE

CROSS REFERENCE TO RELATED APPLICATIONS

This application claims priority to and the benefit of the filing date of U.S. Provisional Application No. 62/724,697, filed on Aug. 30, 2018, entitled "UAV WITH CONTROLLER CASE", which is hereby incorporated by reference in its entirety.

FIELD OF THE INVENTION

This patent specification relates to the field of Unmanned Aerial Vehicles (UAVs) and drones. More specifically, this patent specification relates to a UAV with controller case for safety, law enforcement, military, and other applications.

BACKGROUND

An Unmanned Aerial Vehicle is a pilotless aircraft that is known in the art and is often used for surveillance, package delivery, and racing sports. UAVs may be particularly useful in the field of law enforcement, especially if they are readily available for deployment and if they comprise enhanced features that assist the law enforcement officer that is deploying the UAV. These features may comprise the ability to illuminate an area, the ability to record still photos and/or video, the ability to play audio from the UAV, and the ability to fire a stun gun at a perpetrator.

Therefore, a need exists for a novel UAV that is portable and immediately deployable when needed. There is also a need for novel UAV with enhanced features useful in the field of law enforcement and security applications in general.

BRIEF SUMMARY OF THE INVENTION

A UAV (unmanned aerial vehicle) controller device is provided. In some embodiments, the device may include a control panel having one or more user control inputs, and a processing unit may be in communication with the control inputs. A display screen may also be in communication with the processing unit. A side wall may be coupled to a proximal wall and to a distal wall, the side wall, proximal wall, and distal wall forming a storage compartment. The storage compartment may have a storage cavity for removably receiving a UAV, and the UAV may be in wireless communication with the processing unit. A camera, for recording video, may be coupled to the UAV. Video recorded by the camera may be displayed on the display screen, and one or more of the control inputs may govern movement of the UAV.

In further embodiments, the device may include a control panel having one or more user control inputs, and a processing unit may be in communication with the control inputs. A side wall may be coupled to a proximal wall and to a distal wall, the side wall, proximal wall, and distal wall forming a storage compartment. The storage compartment may have a storage cavity for removably receiving a UAV, and the UAV may be in wireless communication with the processing unit. A display screen may be in communication with the processing unit, and the display screen may be movable between an open position, in which the display screen does not block access to the user control inputs, and a closed position in which the display screen blocks access to the user control inputs. A camera, for recording video, may be coupled to the UAV. Video recorded by the camera may be displayed on the display screen, and one or more of the control inputs may governs movement of the UAV.

BRIEF DESCRIPTION OF THE DRAWINGS

Some embodiments of the present invention are illustrated as an example and are not limited by the figures of the accompanying drawings, in which like references may indicate similar elements and in which:

FIG. 9 depicts a perspective view of an example of a user using a UAV controller device according to various embodiments described herein.

DETAILED DESCRIPTION OF THE INVENTION

The terminology used herein is for the purpose of describing particular embodiments only and is not intended to be limiting of the invention. As used herein, the term "and/or" includes any and all combinations of one or more of the associated listed items. As used herein, the singular forms "a," "an," and "the" are intended to include the plural forms as well as the singular forms, unless the context clearly indicates otherwise. It will be further understood that the terms "comprises" and/or "comprising," when used in this specification, specify the presence of stated features, steps, operations, elements, and/or components, but do not preclude the presence or addition of one or more other features, steps, operations, elements, components, and/or groups thereof.

Definitions

As used in this disclosure, "RC" is an acronym for radio control.

As used herein, "RC controller" or "RC remote controller" refers to a handheld, battery-operated control box that is used to control the movement and/or operation of a remote device. As non-limiting examples, the remote device is frequently a radio-controlled car, boat, or aircraft. RC controllers typically comprise one or more of the following: one or more joysticks, one or more trim controls, a telescoping antenna, a power switch, a power indicator, and frequency-determining crystal.

As used herein, "unmanned aerial vehicle" (UAV) or "drone" refers to an aircraft without a human pilot aboard. UAVs are often remotely piloted and may comprise a certain degree of autonomy. Common uses for UAVs include, but are not limited to, surveillance, package delivery, and racing.

Figure 1:
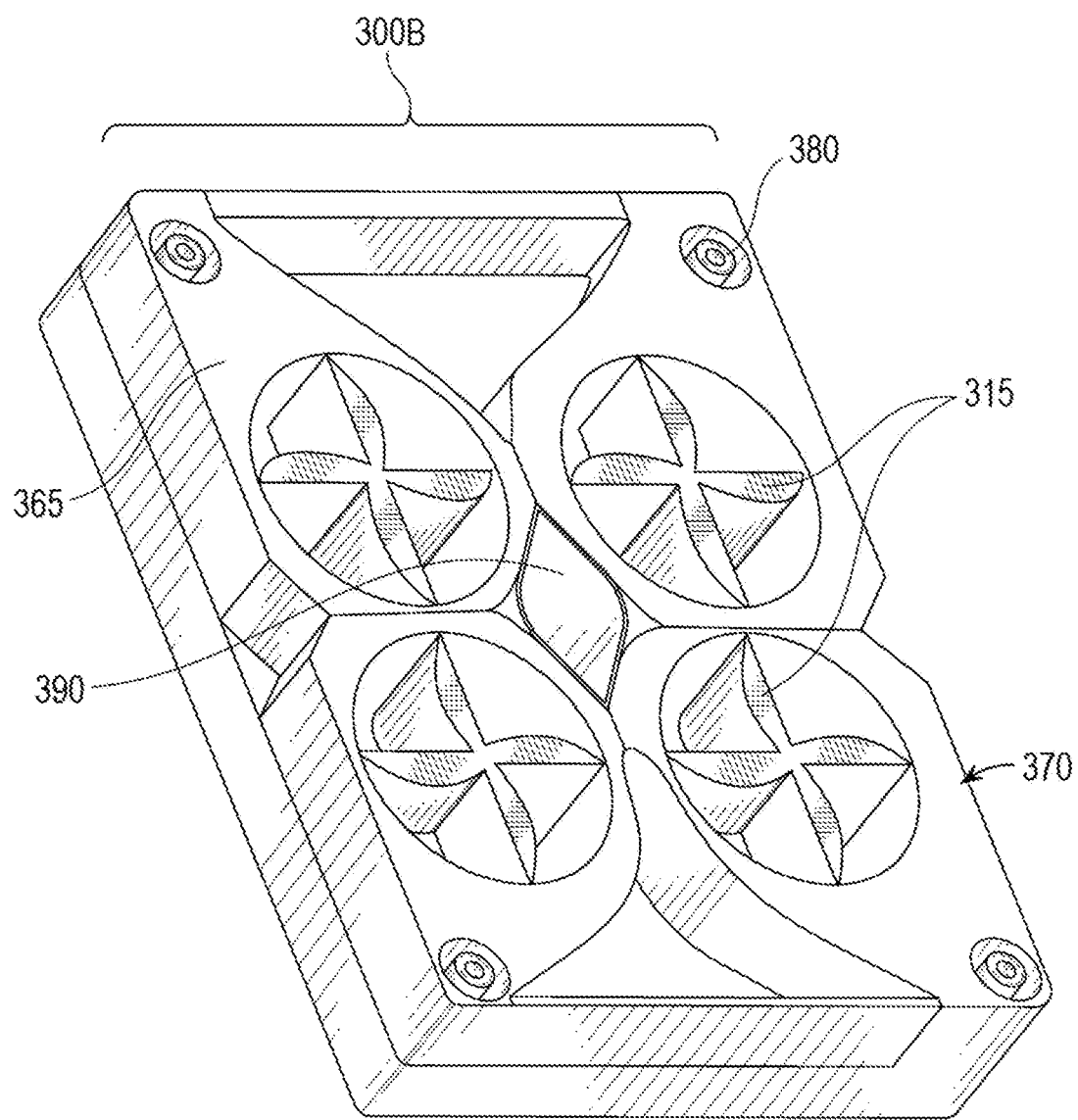
FIG. 1 shows a perspective view of an example of a folding wing UAV having its wing arms in a storage position according to various embodiments described herein.
Figure 2:
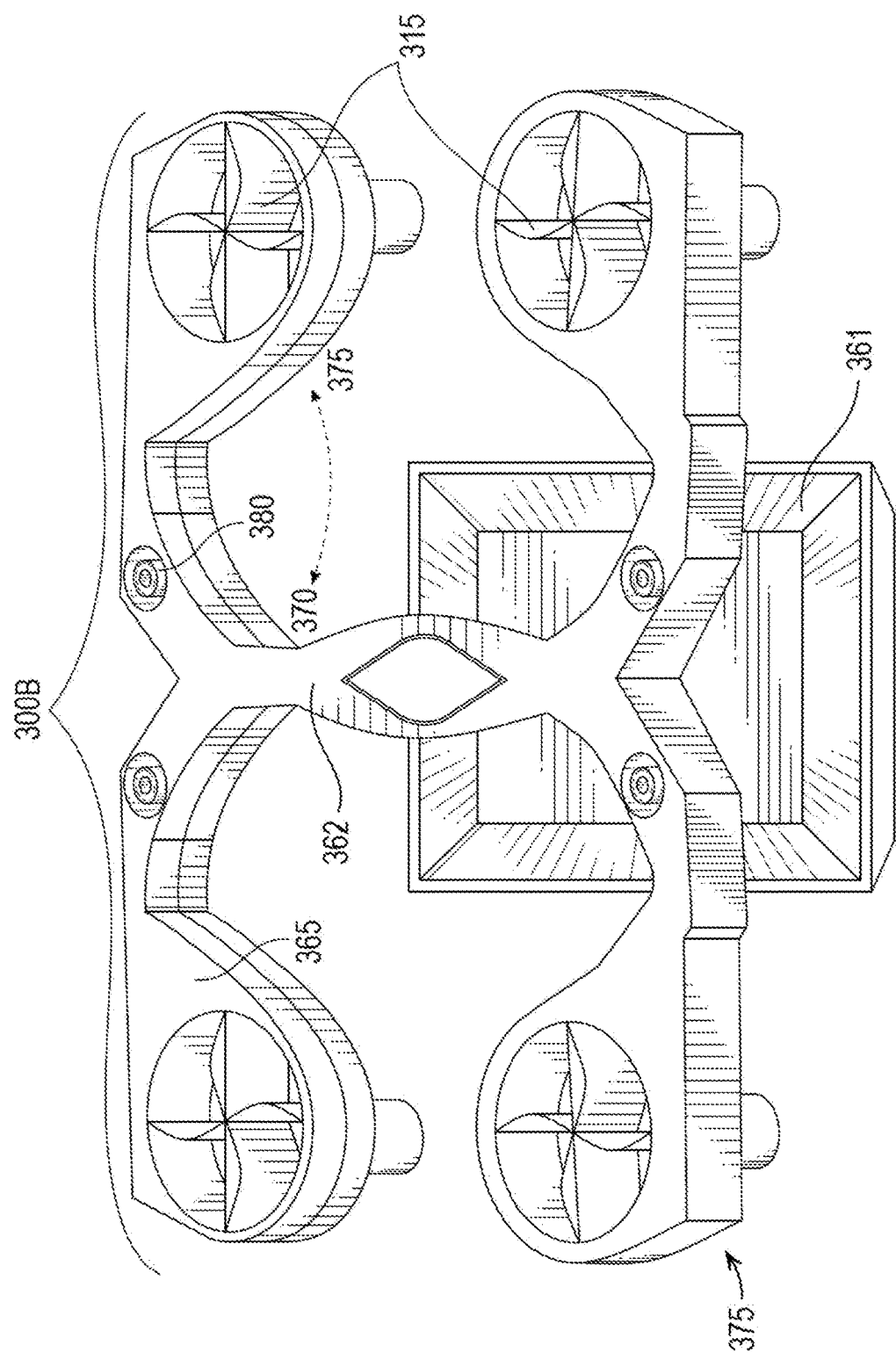
FIG. 2 illustrates a perspective view of an example of a folding wing UAV having its wing arms in a deployed position according to various embodiments described herein.

For purposes of description herein, the terms "upper", "lower", "left", "right", "rear", "front", "side", "vertical", "horizontal", and derivatives thereof shall relate to the invention as oriented in FIG. 1. However, one will understand that the invention may assume various alternative orientations and step sequences, except where expressly specified to the contrary. Therefore, the specific devices and processes illustrated in the attached drawings, and described in the following specification, are simply exemplary embodiments of the inventive concepts defined in the appended claims. Hence, specific dimensions and other physical characteristics relating to the embodiments disclosed herein are not to be considered as limiting, unless the claims expressly state otherwise.

Although the terms "first", "second", etc. are used herein to describe various elements, these elements should not be limited by these terms. These terms are only used to distinguish one element from another element. For example, the first element may be designated as the second element, and the second element may be likewise designated as the first element without departing from the scope of the invention.

As used in this application, the term "about" or "approximately" refers to a range of values within plus or minus 10% of the specified number. Additionally, as used in this application, the term "substantially" means that the actual value is within about 10% of the actual desired value, particularly within about 5% of the actual desired value and especially within about 1% of the actual desired value of any variable, element or limit set forth herein.

Unless otherwise defined, all terms (including technical and scientific terms) used herein have the same meaning as commonly understood by one having ordinary skill in the art to which this invention belongs. It will be further understood that terms, such as those defined in commonly used dictionaries, should be interpreted as having a meaning that is consistent with their meaning in the context of the relevant art and the present disclosure and will not be interpreted in an idealized or overly formal sense unless expressly so defined herein.

In describing the invention, it will be understood that a number of techniques and steps are disclosed. Each of these has individual benefit and each can also be used in conjunction with one or more, or in some cases all, of the other disclosed techniques. Accordingly, for the sake of clarity, this description will refrain from repeating every possible combination of the individual steps in an unnecessary fashion. Nevertheless, the specification and claims should be read with the understanding that such combinations are entirely within the scope of the invention and the claims.

A new UAV controller device is discussed herein. In the following description, for purposes of explanation, numerous specific details are set forth in order to provide a thorough understanding of the present invention. It will be evident, however, to one skilled in the art that the present invention may be practiced without these specific details.

The present disclosure is to be considered as an exemplification of the invention, and is not intended to limit the invention to the specific embodiments illustrated by the figures or description below.

The present invention will now be described by example and through referencing the appended figures representing preferred and alternative embodiments. FIGS. 11, 12, and 15-20 illustrate examples of a UAV controller device ("the device") 100 according to various embodiments. In preferred embodiments, the device 100 may comprise a controller case 200 and an unmanned aerial vehicle (UAV) 300 which may be removably positioned within a storage cavity 425 of the controller case 200.

In some embodiments, the device 100 may comprise a control panel 400 having one or more user control inputs 429. A processing unit 401 may be in communication with the control inputs 429 and in communication with a display screen 470. A side wall 420 may be coupled to a proximal wall 421 and to a distal wall 42, and the side wall 420, proximal wall 421, and distal wall 42 may form a UAV compartment 210 having a storage cavity 425 for removably receiving an UAV 300. The UAV 300 may be in wireless communication with the processing unit 401, and at least one control input 429 may govern movement of the UAV 300. A camera 310 for recording video may be coupled to the UAV 300, and video recorded by the camera 310 may be displayed on the display screen 470.

In further embodiments, the device 100 may comprise a control panel 400 having one or more user control inputs 429. A processing unit 401 may be in communication with the control inputs 429 and in communication with a display screen 470. A side wall 420 may be coupled to a proximal wall 421 and to a distal wall 422, and the side wall 420, proximal wall 421, and distal wall 422 may form a UAV compartment 210 having a storage cavity 425 for removably receiving an UAV 300. The display screen 470 may be movable between an open position 171, in which the display screen 470 does not block access to the user control input 429, and a closed position 172, in which the display screen 470 blocks access to the user control input 429.

In some embodiments, a controller case 200 may comprise one or more UAV compartments 210 and a control panel 400. In further embodiments, a controller case 200 may comprise one or more UAV compartments 210, a control panel 400, and a display screen 470. Optionally, the controller case 200 may comprise one or more clips 205.

The controller case 200 may comprise one or more walls which may be coupled together to form the UAV compartment 210 and its storage cavity 425. In preferred embodiments, a UAV compartment 210 and its storage cavity 425 may be formed by a side wall 420, a proximal wall 421, and a distal wall 422. The walls 420, 421, 422, which form all or portions of a UAV compartment 210 may comprise any suitable material(s) which may form a rigid, resilient, or flexible walled containment for a UAV 300 and optionally the control panel 400.

Generally, a side wall 420 may be shaped to separate a proximal wall 421 from a distal wall 422 so as to form the height dimension of the UAV compartment 210 and/or its storage cavity 425, while a proximal wall 421 and a distal wall 422 may form the width and length dimensions of the UAV compartment 210 and/or its storage cavity 425. A proximal wall 421 and a distal wall 422 may be differentiated by their positioning relative to a control panel 400 with all or portions of the proximal wall 421 positioned closer to the control panel 400 than all or portions of the distal wall 422.

In some embodiments, the control panel 400 may form, function as, or be coupled to a proximal wall 421 of the UAV compartment 210. As a non-limiting example, the control panel 400 may comprise or function as the proximal wall 421 of the UAV compartment 210. The UAV may reside in the UAV compartment 210, against the control panel 400, and when the UAV is removed from the UAV compartment 210 the control panel 400 may be pivoted open and used.

In preferred embodiments, a UAV compartment 210 and/or its storage cavity 425 may comprise a substantially rectangular prism shape that may be open on all or portions of at least one side to allow access to the storage cavity 425 that may be formed by a three sided side wall 420 and a substantially rectangular shaped proximal wall 421 and distal wall 422. However, it should be understood that a side wall 420, a proximal wall 421, and a distal wall 422 may be configured in any shape and size so as to form a UAV compartment 210 its storage cavity 425 for receiving a UAV 300 of any shape and size.

In preferred embodiments, the exterior surfaces of a side wall 420, a proximal wall 421, and a distal wall 422 may be made from substantially rigid materials, such as steel alloys, aluminum, aluminum alloys, copper alloys, other types of metal or metal alloys, various types of hard plastics, such as polyethylene (PE), Ultra-high-molecular-weight polyethylene (UHMWPE, UHMW), polypropylene (PP) and polyvinyl chloride (PVC), polycarbonate, nylon, Poly(methyl methacrylate) (PMMA) also known as acrylic, melamine, hard rubbers, fiberglass, carbon fiber, resins, such as epoxy resin, wood, other plant based materials, or any other material including combinations of materials.

In further preferred embodiments, the interior surfaces of the UAV compartment 210 that form and bound the storage cavity 425 may be made from or may comprise a resilient material may be configured to absorb impacts or provide a resilient cushioning layer between a UAV 300 and the interior surfaces of the UAV compartment 210. Example resilient materials may include silicone rubber, silicone foams, rubber foams, urethane foams including plastic foams, neoprene foam, latex foam rubber, polyurethane foam rubber, or elastomer materials such as elastic plastics, elastic silicone, elastic rubbers, or any other suitable elastomer or resilient material including combinations of materials.

In further preferred embodiments, the device 100 may comprise one or more UAV outer shell storage casings 540 which may be configured to surround all or portions of a UAV 300 and to secure the UAV 300 within the storage cavity 425 of a UAV compartment 210. Generally, an UAV outer shell storage casing 540 may be used for UAV's 300 having non-conforming shapes that are not compatible with the shape of a storage cavity 425 interior of the UAV storage compartment 210. For example, many fixed wing UAVs 300 have various shapes and an UAV outer shell storage casing 540 may be used to house the UAV 300 and then the UAV outer shell storage casing 540 fits into the storage cavity 425 of the UAV compartment 210. In this manner, the UAV compartment 210 of the device 100 may be used with UAV's 300 having complex designs, without requiring the UAV compartment 210 to be changed. UAV outer shell storage casings 540 may be made from or may comprise any substantially rigid material which may maintain an exterior shape that is consistent with and matches the interior shape and space of the storage cavity 425 within the UAV compartment 220. The UAV outer shell storage casing 540 interior may be made of or may comprise any type of foam, or other resilient material, plastic, wood or other material. In further embodiments, an UAV outer shell storage casing 540 exterior may be made up of a solid thin plastic, foam, metal or other such material as most desirable for its intended use. In another embodiment the UAV outer shell storage casing 540 may be formed as a framed structure and one that is not completely solid, such as a cage.

Figure 15:
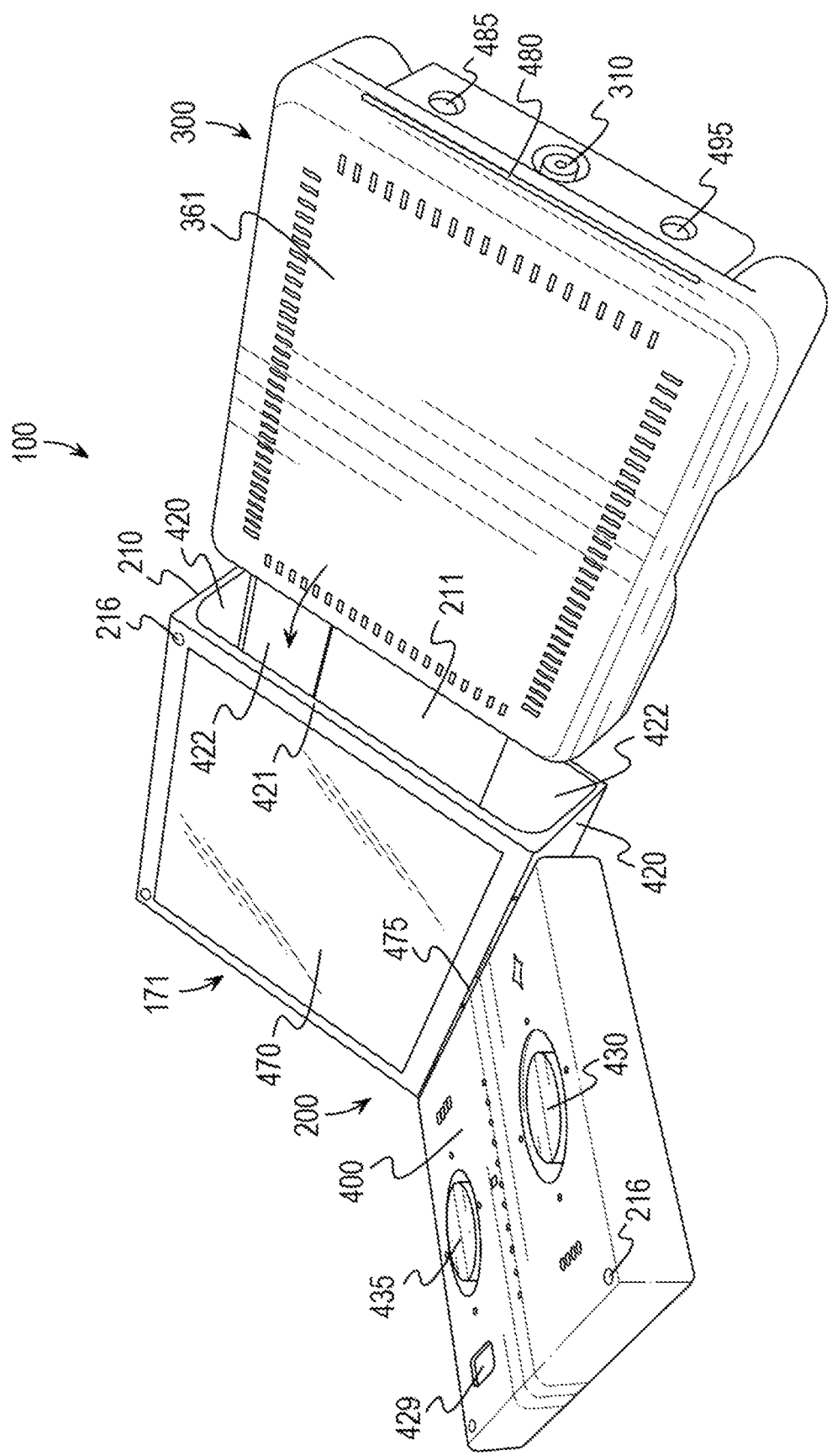
FIG. 15 depicts a perspective view of an example of a UAV controller device having a display screen in an open position according to various embodiments described herein.
Figure 16:
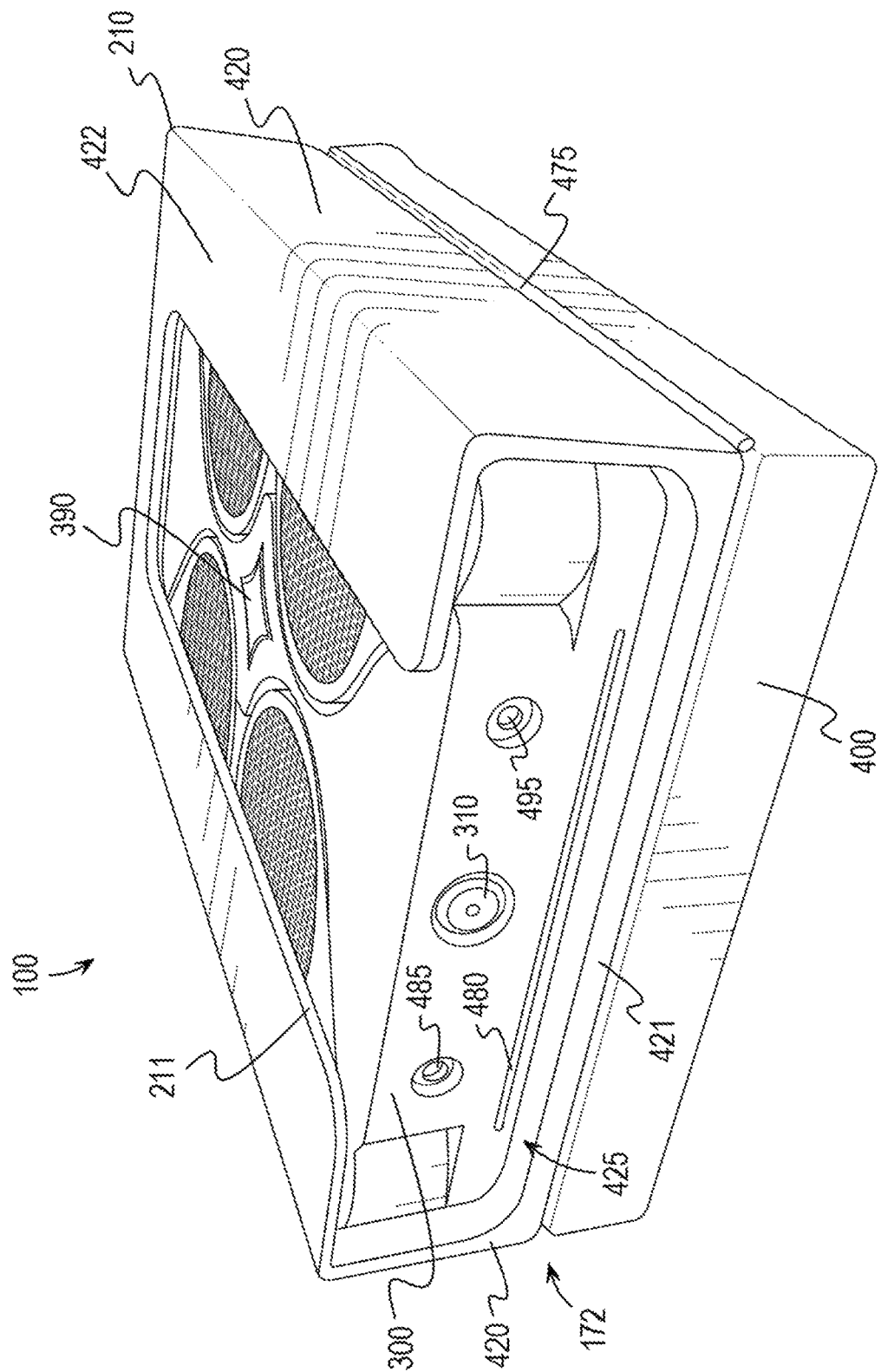
FIG. 16 shows the example UAV controller device having a display screen in a closed position according to various embodiments described herein.
Figure 17:
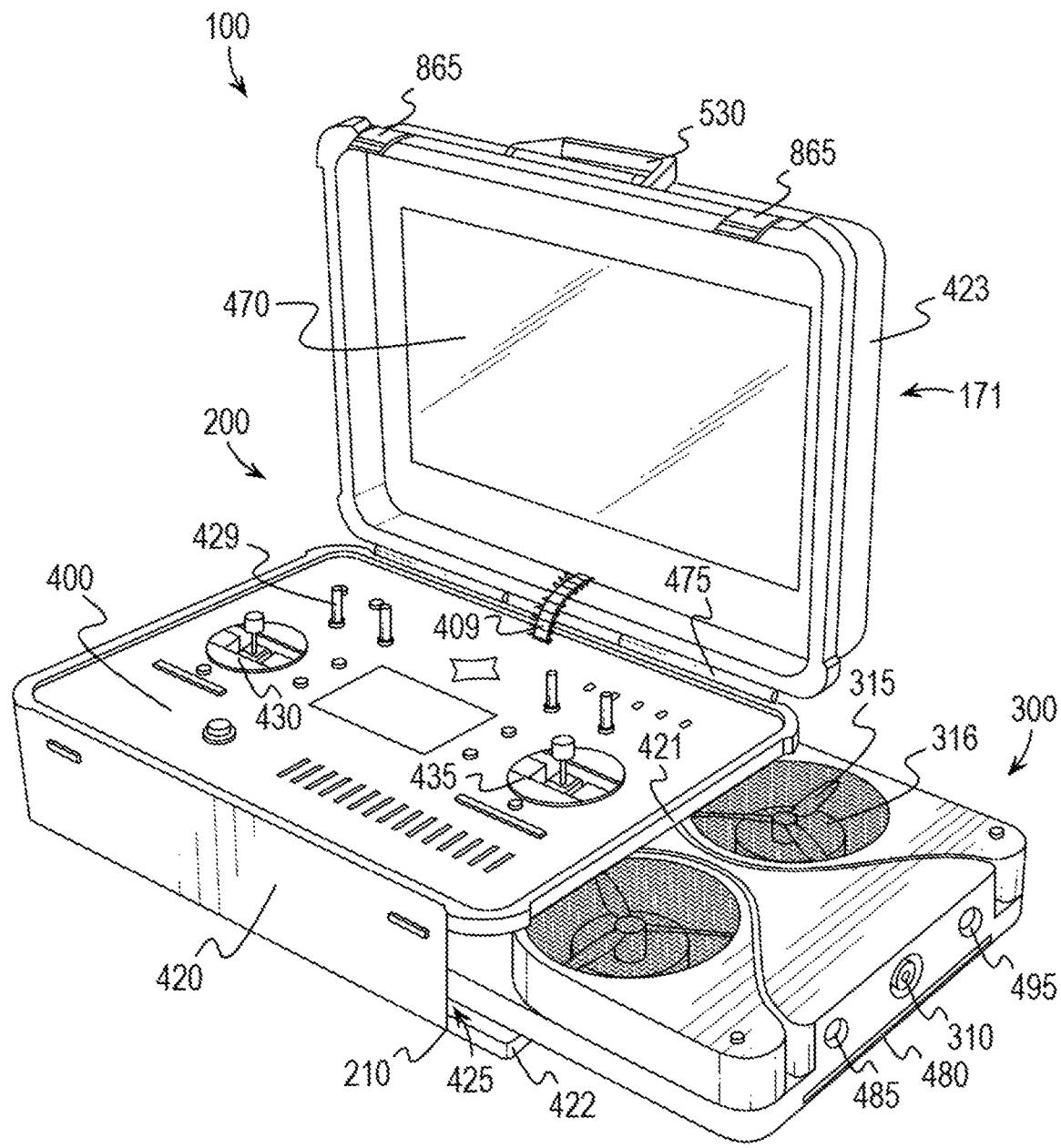
FIG. 17 illustrates a perspective view of another example of a UAV controller device having a display screen in an open position according to various embodiments described herein.
Figure 18:
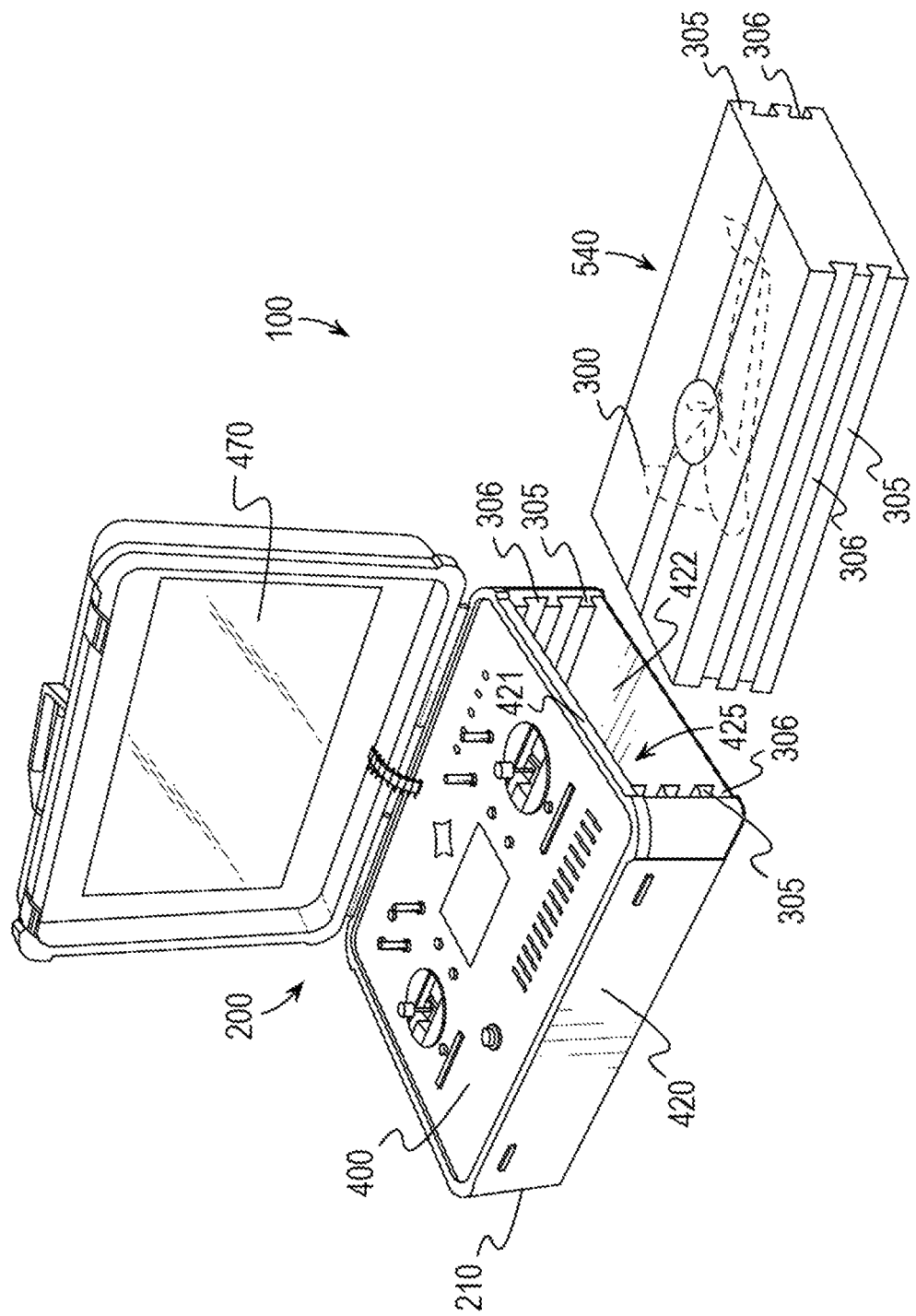
FIG. 18 depicts a perspective view of another example of a UAV controller device having a UAV outer shell storage casing for storing a UAV, the UAV outer shell storage casing having one or more male tracks and female tracks which mate with male and female tracks of a UAV compartment according to various embodiments described herein.
Figure 19:
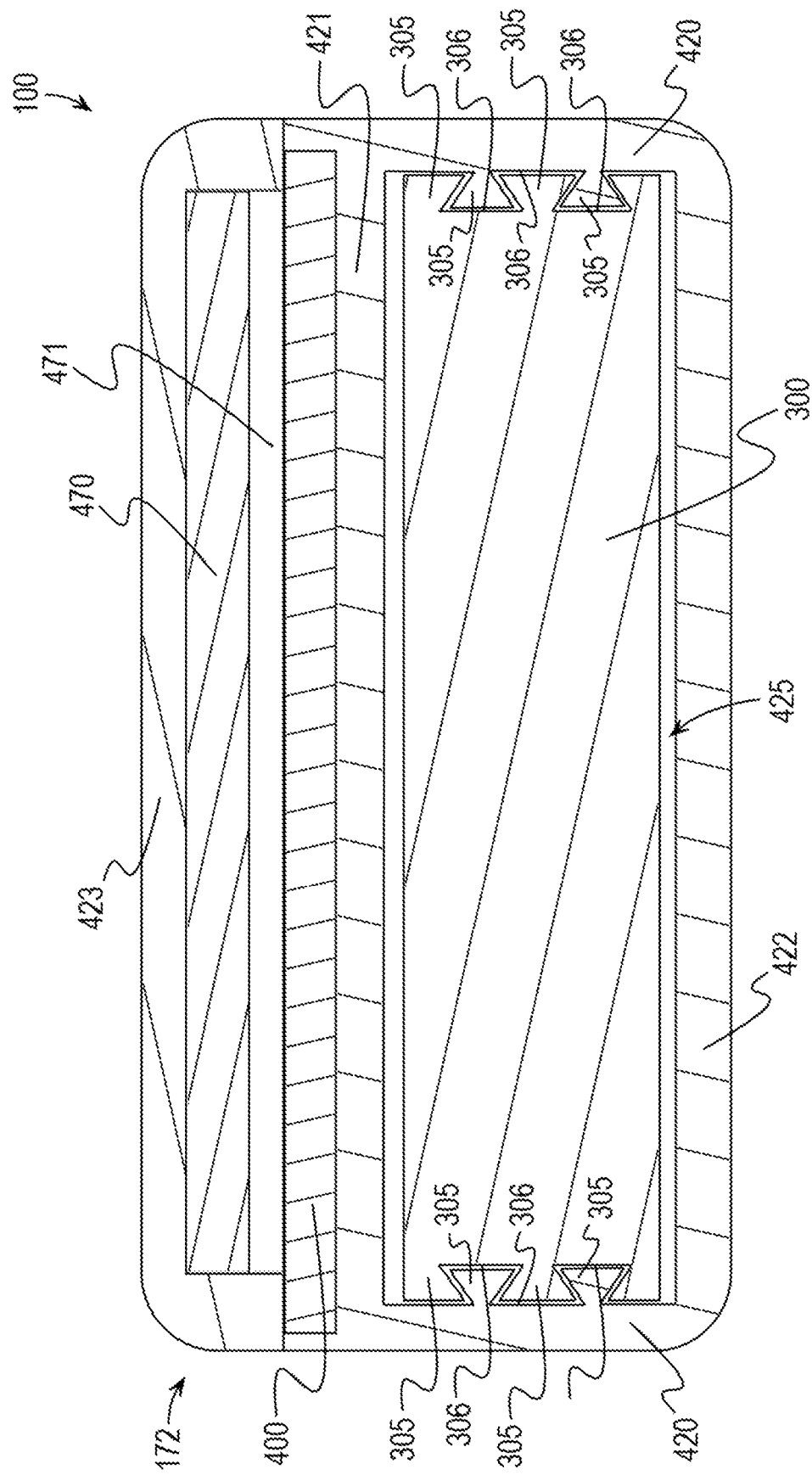
FIG. 19 shows a sectional, elevation view of an example of a UAV controller device having a display screen in a closed position and having a UAV removably coupled within a storage cavity of a storage compartment via the engagement of male tracks and female tracks according to various embodiments described herein.
Figure 20:
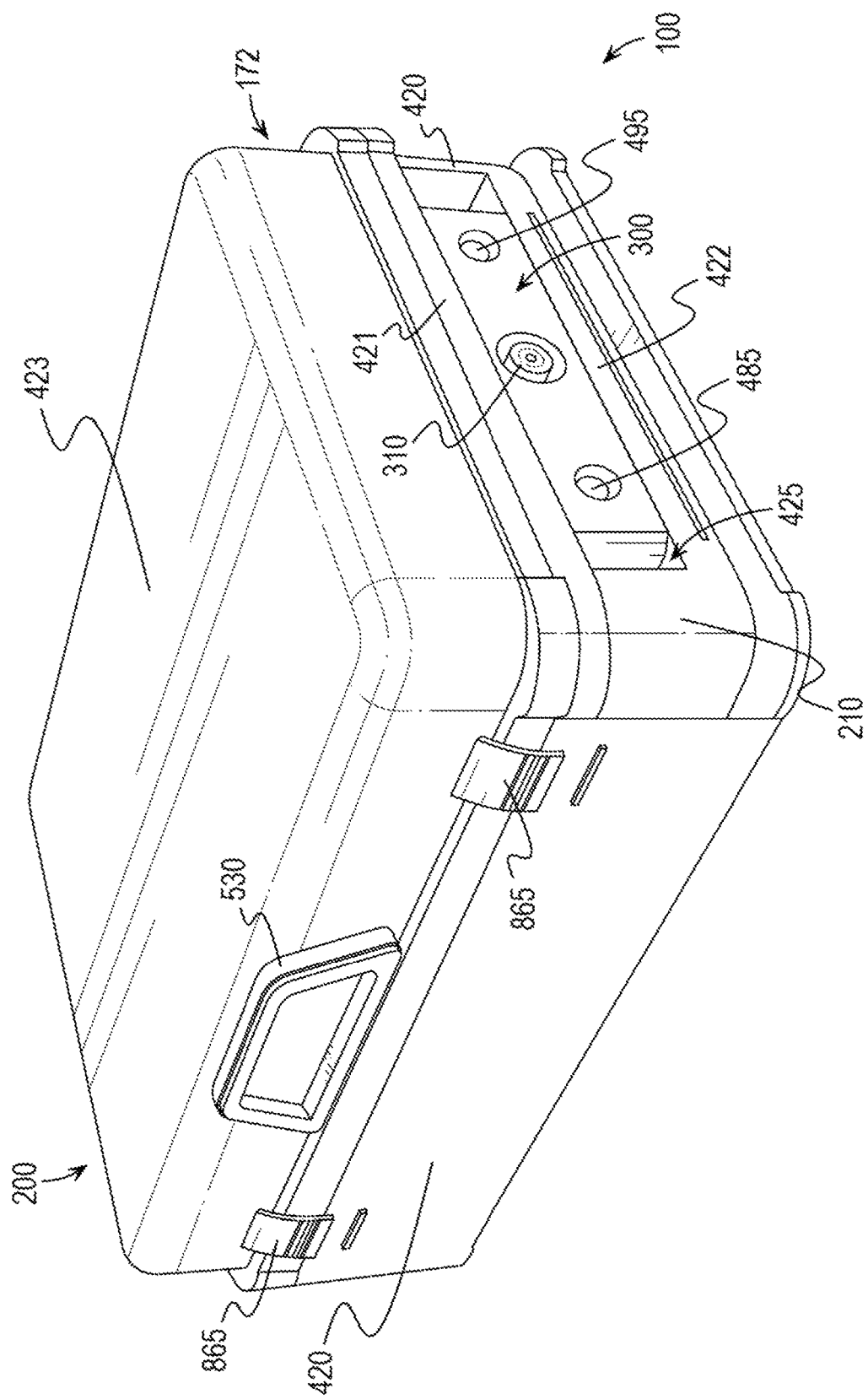
FIG. 20 illustrates an example UAV controller device having a display screen in a closed position according to various embodiments described herein.
Figure 21:
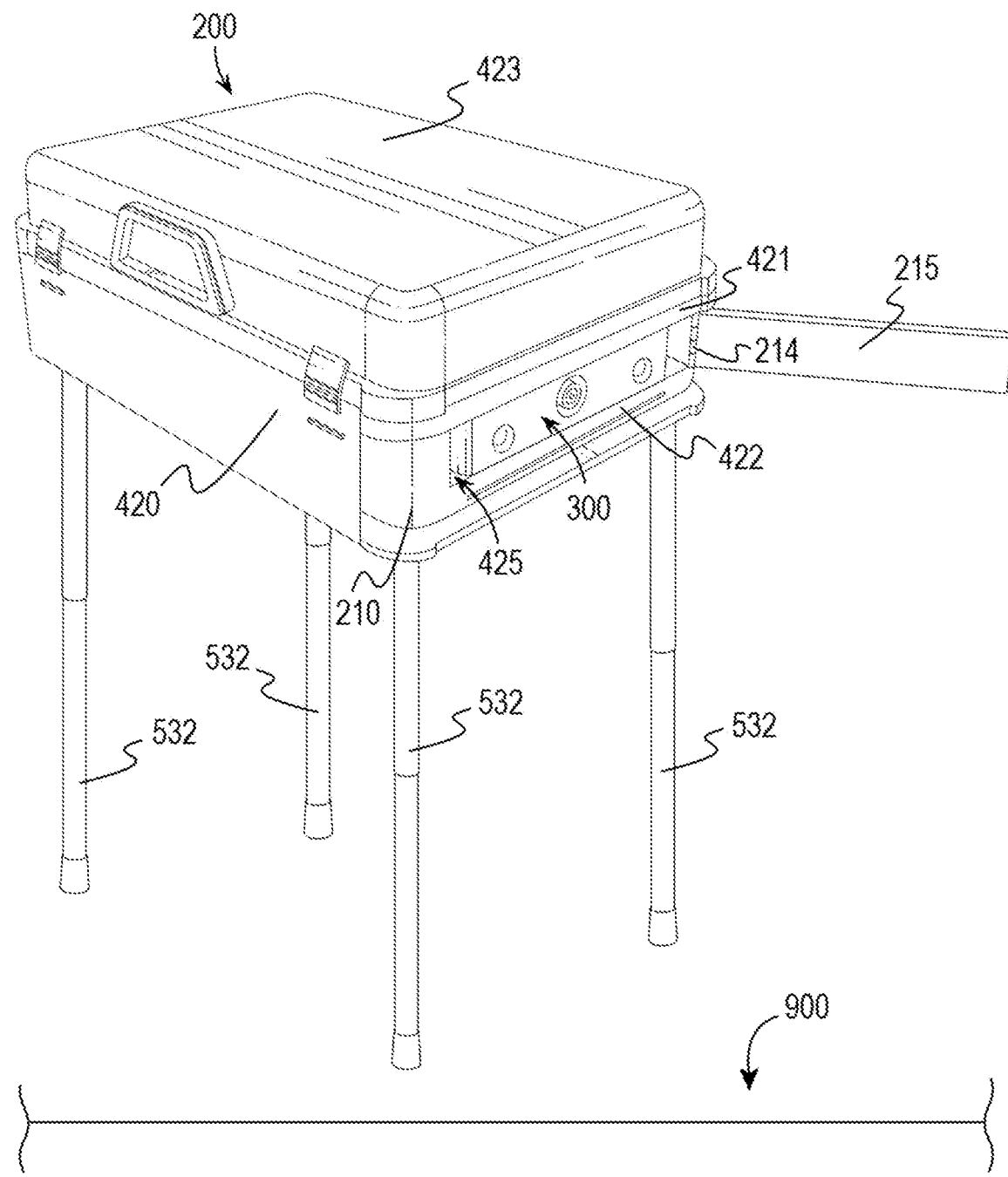
FIG. 21 depicts a perspective view of yet another example of a UAV controller device according to various embodiments described herein.
Figure 22:
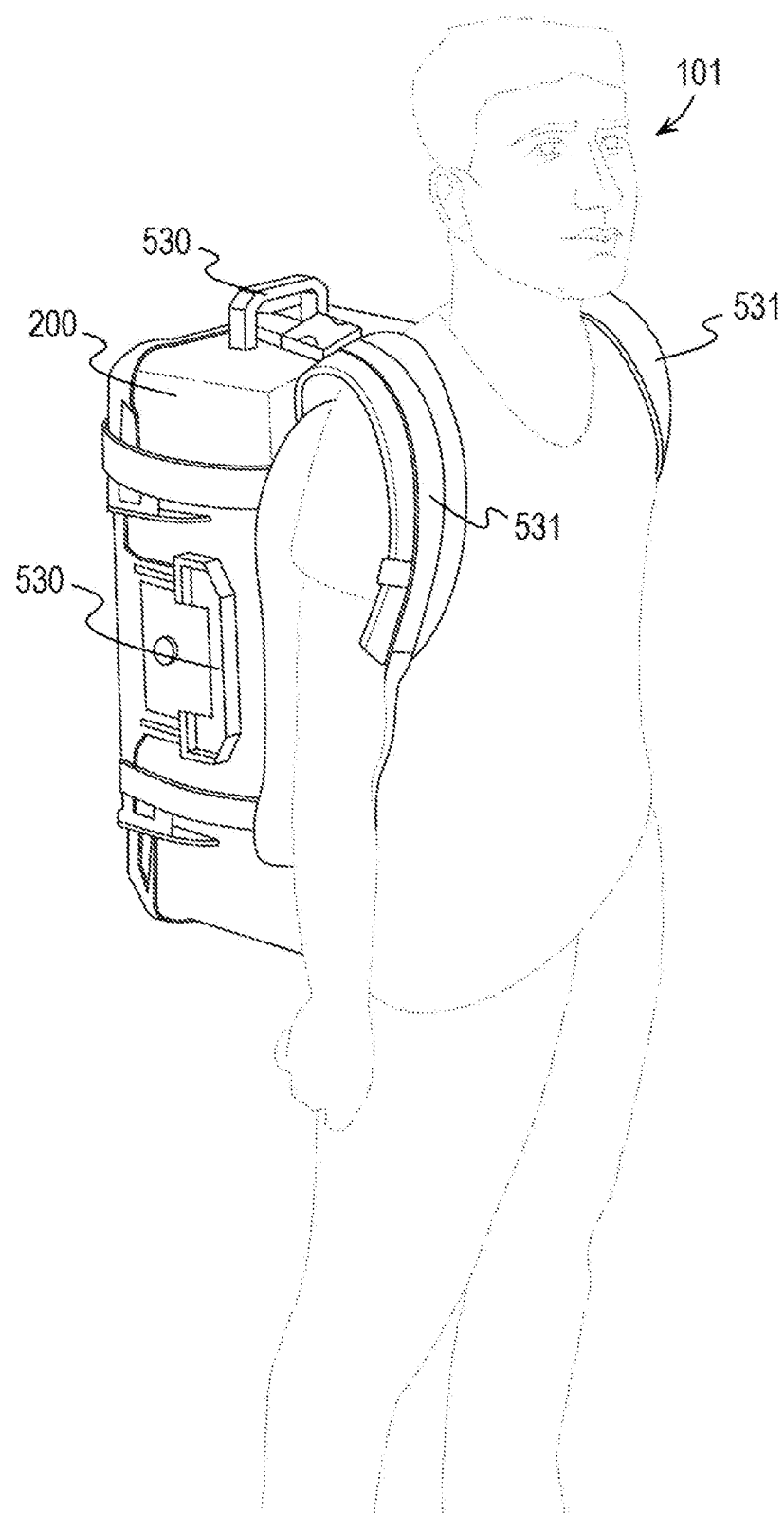
FIG. 22 shows a perspective view of still another example of a UAV controller device according to various embodiments described herein.
Figure 23:
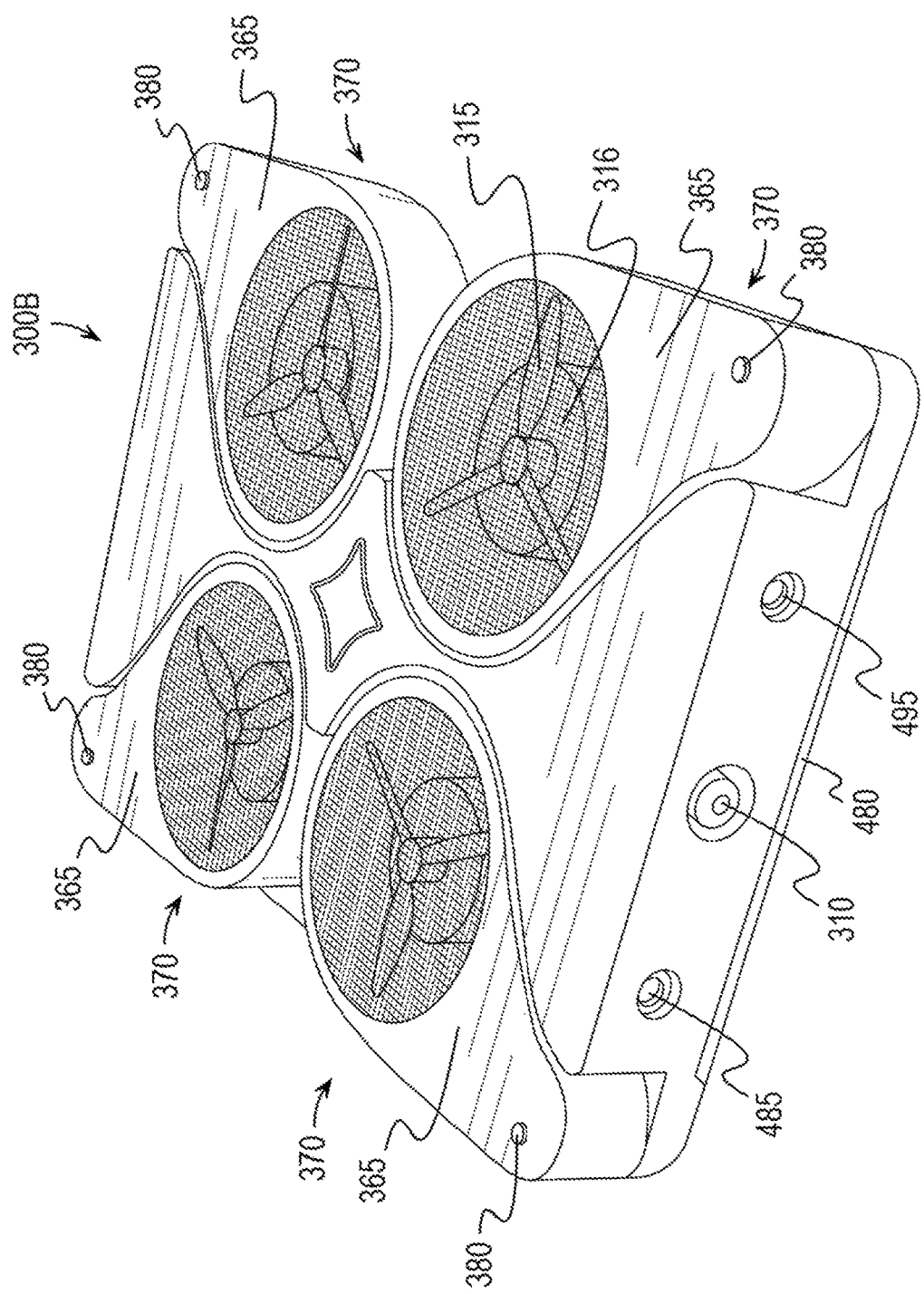
FIG. 23 depicts a perspective view of still another example of a folding wing UAV having its wing arms in a storage position according to various embodiments described herein.
Figure 24:
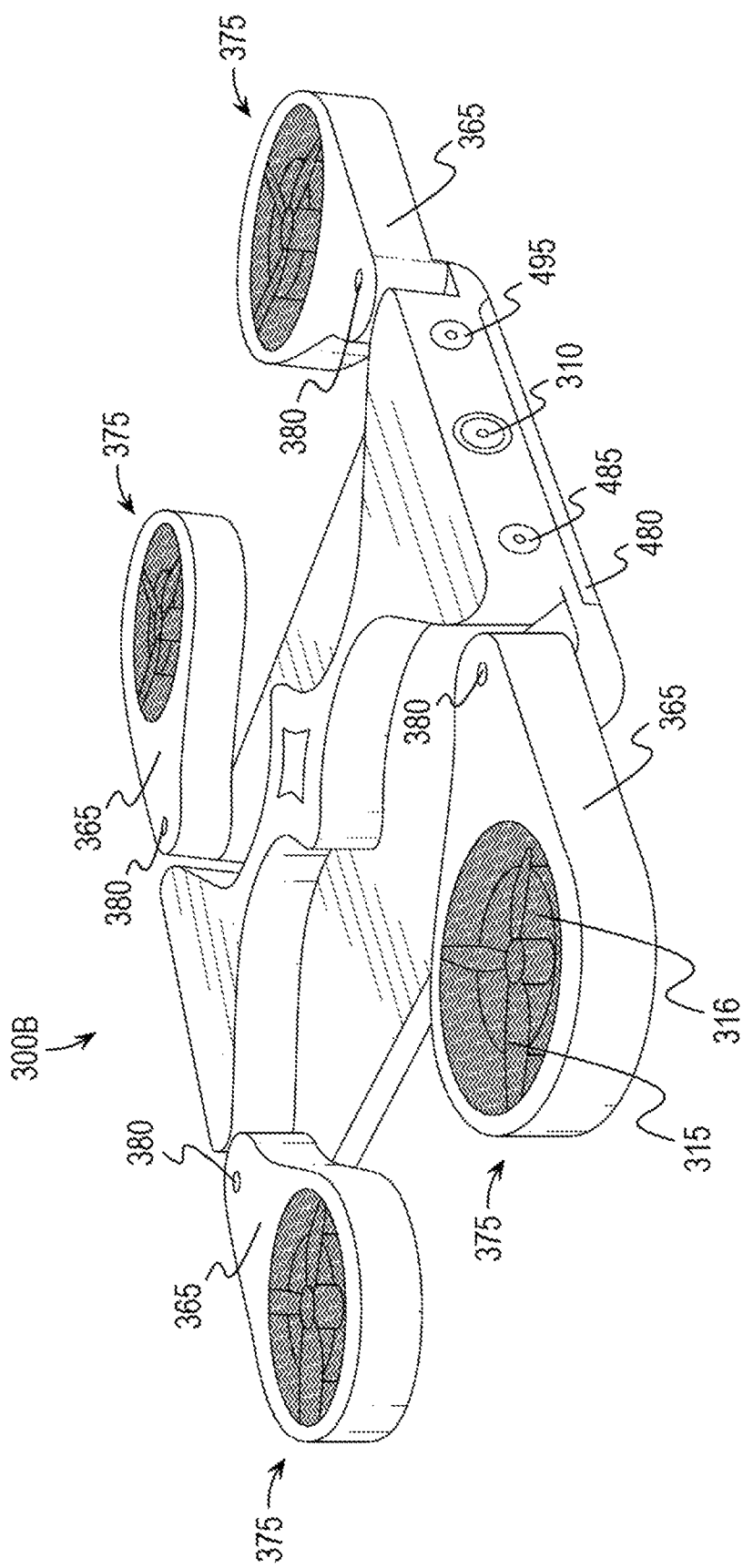
FIG. 24 illustrates an example UAV having its wing arms in a deployed position according to various embodiments described herein.

In some embodiments, the device 100 may comprise a UAV compartment 210 that may be positioned above the control panel 400. For example, a UAV compartment 210 may be coupled to the back of a display screen 470 which is movable between an open position 171 and a closed position 172 as shown in FIGS. 15 and 16. In some embodiments, the device 100 may comprise a UAV compartment 210 that may be positioned below the control panel 400. For example, a UAV compartment 210 may be coupled to the bottom of a control panel 400 while a display screen 470 may be coupled generally above the control panel 400 and is movable between an open position 171 and a closed position 172 as shown in FIGS. 17-20.

The UAV compartment 210 may comprise storage cavity 425 that is at least as large as the UAV 300 that is intended to reside within the storage cavity 425. The UAV 300 may reside within the storage cavity 425 of the UAV compartment 210 when the UAV 300 is not in use. Optionally, the UAV 300 may be removably coupled within the storage cavity 425 to be maintained in place by straps, hook and loop fasteners, magnets, other fasteners, or combinations thereof.

In preferred embodiments, the device 100 may comprise one or more male tracks 305 and female tracks 306 which may be removably coupled together and used to engage a UAV 300 within the storage cavity 425 of the UAV compartment 210. Preferably, portions of a male track 305 may be received in portions of a female track 306 in order to couple or engage the tracks 305, 306, together. In further preferred embodiments, a male track 305 may be configured as a tail of a dove tail joint, and a female track 306 may be configured as a socket of a dovetail joint so that the male track 305 may be removably and slidably received in the female track 306 as a dove tail joining method. In some embodiments, a UAV 300 may comprise one or more male tracks 305 and/or female tracks 306 and the UAV compartment 210 may comprise one or more male tracks 305 and/or female tracks 306 within the storage cavity 425 so that the male tracks 305 and/or female tracks 306 of the UAV 300 may be removably coupled to the male tracks 305 and/or female tracks 306 of the UAV compartment 210 to removably coupled the UAV 300 within the UAV compartment 210. In some embodiments, the device 100 may comprise a UAV outer shell storage casing 540 which may be configured as a container that the UAV 300 may be positioned inside and the UAV outer shell storage casing 540 may be removably coupled within the UAV compartment 210 via one or more male tracks 305 and/or female tracks 306 disposed on the container that may be removably coupled to male tracks 305 and/or female tracks 306 of the UAV compartment 210 to removably coupled the UAV 300 within the UAV compartment 210.

In some embodiments, the device 100 may comprise a recess 211 which may comprise a cutout or other opening which may extend into one or more walls 420, 421, 422, to facilitate a user 101 grasping or otherwise manipulating the UAV 300 to insert or remove the UAV 300 from the storage cavity 425. For example and as shown in FIG. 16, a recess 211 may comprise a cutout or opening in the distal wall 422 that may partially expose a UAV 300 within the storage cavity 425 so that the user 101 can place a thumb or finger on the exposed portion of the UAV provided by the recess 211 to facilitate the user 101 sliding the UAV 300 out of the storage cavity 425. A recess 211 may be positioned anywhere on the device 100 so that portions of the UAV 300 within the storage cavity 425 may be exposed from any or various sides, but preferably will expose the top and front of the UAV 300. It may be partially, fully or not exposed at all.

In some embodiments, the device 100 may comprise a carrying handle 530 which may be positioned anywhere on the device 100 so that the device 100 may be carried by hand. In preferred embodiments, a carrying handle 530 may be coupled to the controller case 200, such as to a wall 420, 421, 422, or to an upper lid 423.

In some embodiments, the device 100 may comprise one or more carrying straps 531 which may be coupled, optionally removably coupled, anywhere on the device 100 so that the device 100 may be carried by holding the carrying straps 531 or by placing the carrying straps 531 over the shoulders of the user 101. For example, the device 100 may comprise two carrying straps 531 which may be coupled to the four corners of the distal wall 422, and the carrying straps 531 may be configured as preferably padded straps for carrying the device 100 on a user's 100 back similar to a backpack.

In some embodiments, the device 100 may comprise one or more legs 532 that may be configured to support the controller case 200 above a surface 900, such as a ground surface. Preferably, one or more legs 532 may be coupled to a wall 420, 421, 422, such as the distal wall 422 for supporting distal wall 422 above a surface 900 or object. In preferred embodiments, one or more legs 532 may be movably coupled to the distal wall 422 or other element of the controller case 200, such as by being extendable and retractable and/or by being foldable. For example, the controller case 200 may have four foldable legs 532 that may be movably coupled to the distal wall 422 or bottom of the controller case 200 with hinges. The foldable legs 532 may be connected in two parts, each side having two legs 532. Optionally, a frame in the shape of the distal wall 422 or bottom of the controller case 200 may be connected to the distal wall 422 or bottom of the controller case 200 where two parts fold out, each part having two legs 532 enabling the device 100 to be supported. When folded out the legs 532 may support the weight of the device 100 and allow it to be lifted and supported off the ground, other surface, or object.

In some embodiments and as shown in FIGS. 15-19, the device 100 may comprise a display screen 470 that may be coupled to the control panel 400 and/or to the UAV compartment 210 that holds the UAV 300.

In some embodiments, the device 100 may not comprise a display screen 470, but may comprise a control panel 400 that is movably coupled or coupled in a stationary manner to the UAV compartment 210.

In some embodiments, the display screen 470 may be movable coupled to the controller case 200 and the control panel 400 may be positioned under the display screen 470. In such embodiments, display screen 470 may slide to one side as to expose the control panel 400. In such variations, the UAV compartment 210 may be located under the control panel 400.

In some embodiments, the device 100 may be generally non-opening so that the control panel 400 may be coupled to the UAV compartment 210 in a stationary manner, preferably at an angle (for easier control by the user 101 and ease for removing the UAV 300 from the storage cavity 425 of the UAV compartment 210), which is most desirable, and can range from zero (0) degrees to ninety (90) degrees. For example, the control panel 400 may be coupled to the proximal wall 421 and the distal wall 422 may be angled relative to the control panel 400 and proximal wall 421.

In some embodiments, a controller case 200 may comprise one or more UAV storage compartments of any size and shape. In preferred embodiments, one or more storage compartments may be disposed below the control panel 400 and adjacent to the storage cavity 425. A storage compartment may house elements of the device 100 and accessories such as spare parts for the UAV 300, one or more batteries or other power sources 220, 340, etc.

In some embodiments, a controller case 200 may comprise an access cover 215 which may be configured to protect the UAV 300 while it resides in the storage cavity 425 of the storage compartment 210. An access cover 215 may comprise one or more movable flaps, doors, panels, or the like. In some embodiments, an access cover 215 may detach, slide, or hinge open, to expose or otherwise govern access to the UAV 300 in the storage cavity 425. For example, an access cover 215 may block the open face of the storage compartment 210 when the access cover 215 is closed. In some embodiments, an access cover 215 may have cover hinges 214 for moving the access cover 215 and latches 865 to lock or otherwise secure the access cover 215 in a closed position. In further embodiments, an access cover 215 may also include a locking system and any number of methods from traditional key and tumblers to biometric systems may be employed. In further embodiments, the access cover 215 of a storage compartment 210 may be uncovered and the UAV 300 may be exposed even while it resides in the storage compartment 210. A cover hinge 214 may comprise any type of hinge or other movable coupling, such as which may be used for a wing hinge 380 or a display hinge 475.

In some embodiments, a controller case 200 may comprise a clip 205 and a control panel 400. The UAV 300 may be approximately palm-sized such that the controller case 200 configured to house or receive the UAV 300 and the control panel 400 may be clipped to an article of clothing or a backpack for portability. As a non-limiting example, the device 100 may be adapted to clip to a belt of a law enforcement officer via a clip 205 for rapid deployment during pursuits.

In some embodiments, a clip 205 may comprise a spring-loaded fastener that may be squeezed to open a first gripping projection 205A and a second gripping projection 205B, placed over the article of clothing or the belt, and then may be released to grasp the article of clothing or the belt between the projections 205A, 205B. In some embodiments, the clip 205 may be coupled to the controller case 200, preferably opposite the side that the storage compartment 210 is positioned on. In some embodiments, the clip 205 may slide onto an article of clothing without being squeezed. In further embodiments, the device 100 may comprise a clip 205 located on the backside of the control panel 400 which is able to rotate 360 degrees. In still further embodiments, the device 100 may also use carrying straps 531 that may be attached to the back of the controller case 200 via slits that exist to allow the carrying straps 531 to run through. It should be understood that the device 100 may be carried and attached to objects in various ways. In still further embodiments, the device 100 may comprise a notch that slightly protrudes from the outside and top and left side of the storage compartment 210 may be used in conjunction with a rotating clip 205 to provide for further support of the display screen 470.

In some embodiments, a display screen 470 may be movably coupled to the storage compartment 210 so that the display screen 470 may be moved relative to the storage compartment 210 and/or control panel 400. For example, the device 100 may comprise a male track 305 and a female track 306 which may be configured as a pair of parallel elongated sliding slots that adjoin the storage compartment 210 and display screen 470 with control panel 400. In further embodiments, a display screen 470 may be movably coupled to the control panel 400.

Figure 3:
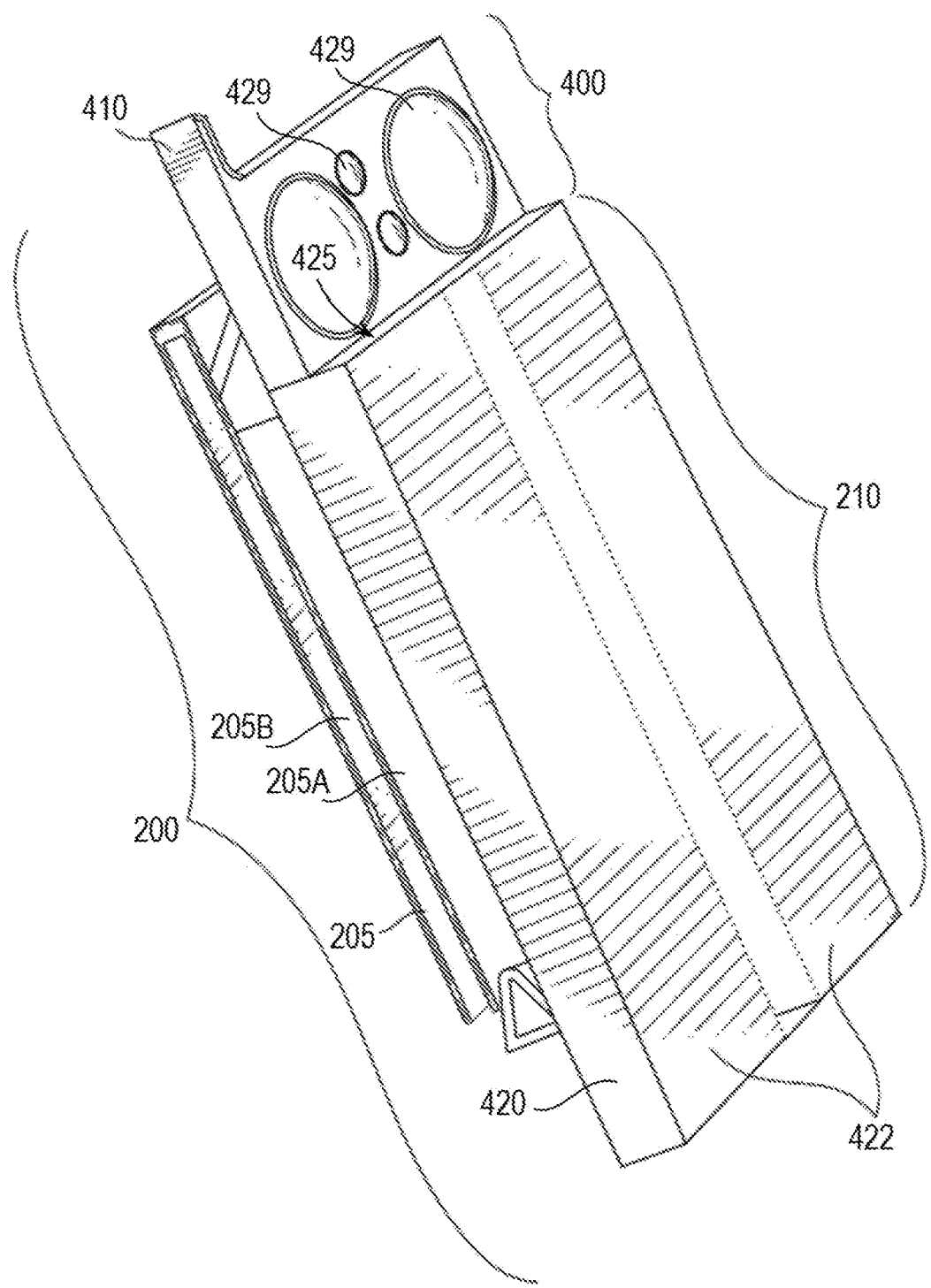
FIG. 3 depicts a perspective view of an example of a controller case according to various embodiments described herein.
Figure 4:
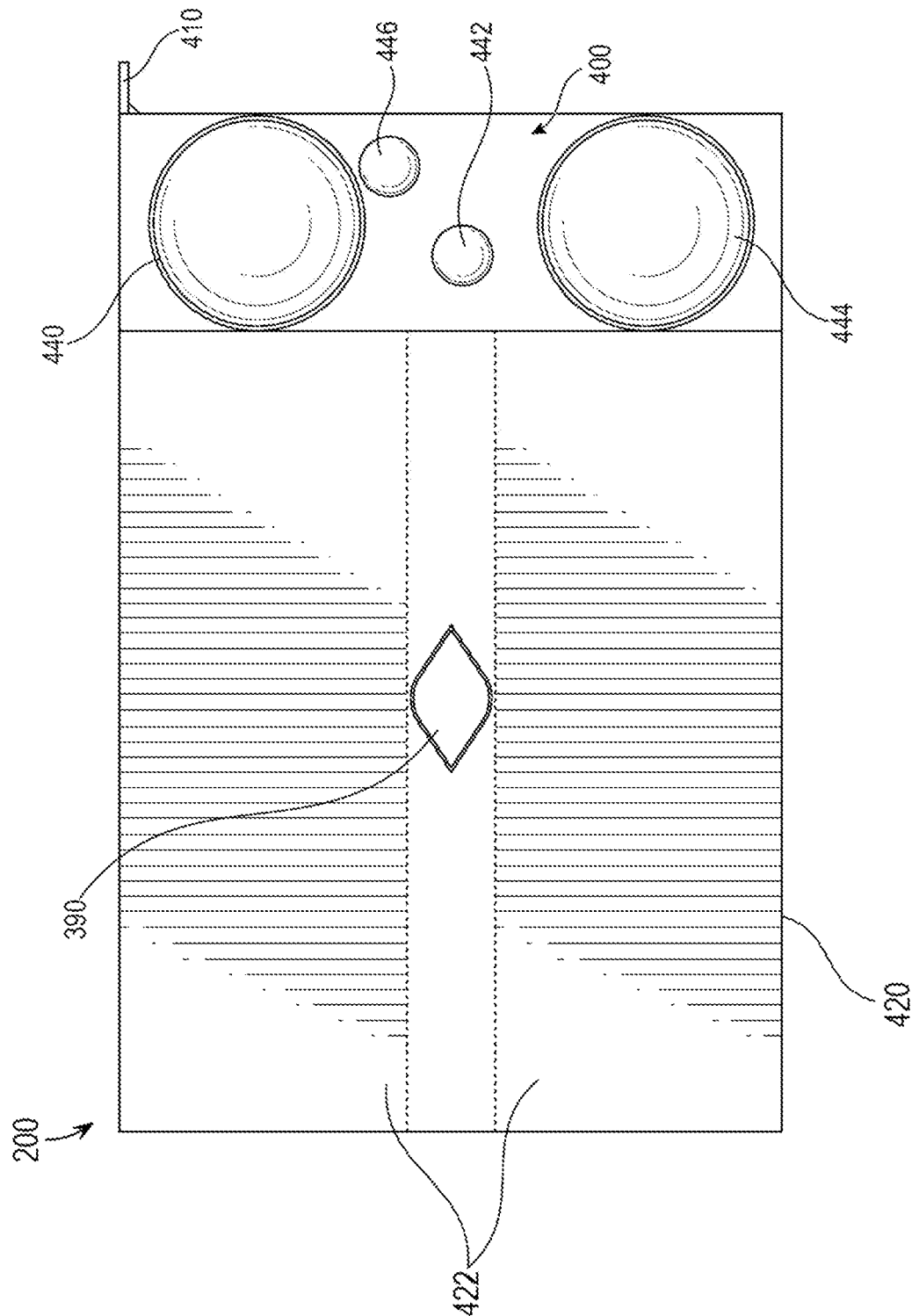
FIG. 4 shows a plan view of an example of a controller case according to various embodiments described herein
Figure 5:
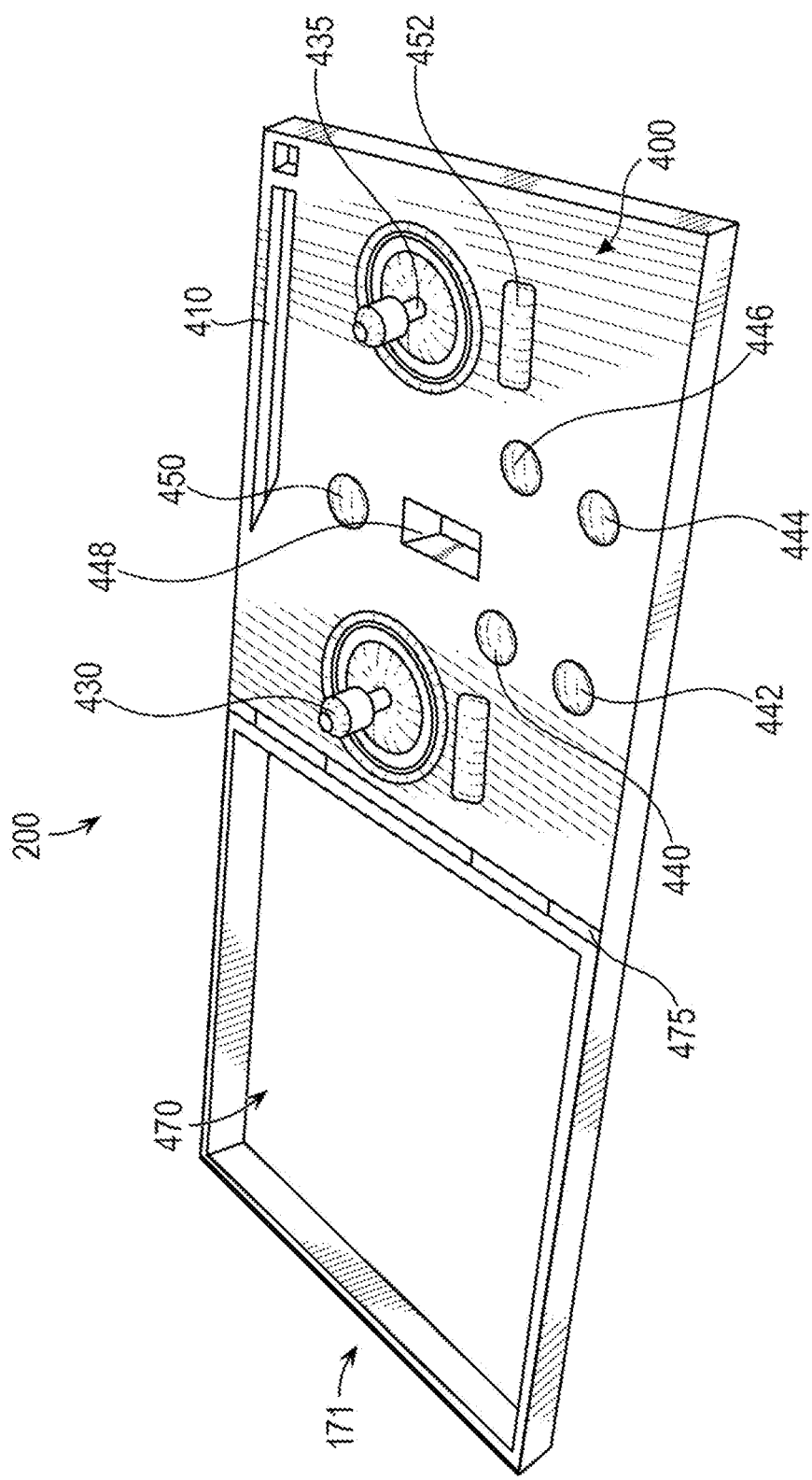
FIG. 5 illustrates a perspective view of an example of a controller case having a display screen in an open position according to various embodiments described herein.
Figure 6:
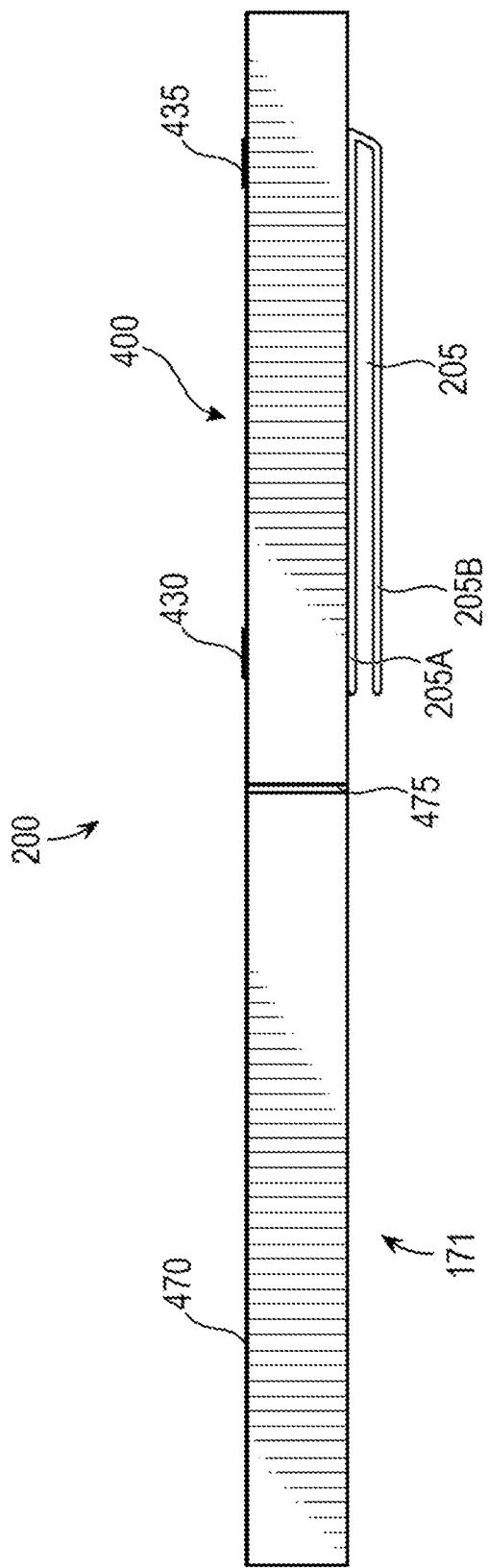
FIG. 6 depicts a side elevation view of an example of a controller case having a display screen in an open position according to various embodiments described herein.

The control panel 400 may be a panel or surface of the controller case 200 comprising one or more, such as a plurality, of control inputs 429 that may function as operator controls which may control the operation or one or more functions of the UAV 300. In some embodiments, the control panel 400 may be used in conjunction with an RC remote controller 930, and the RC remote controller 930 may control flight of the UAV 300 and the control panel 400 may control enhanced or supplemental features of the UAV 300 and preferably record video and images recorded by a camera 310. In some embodiments, and as shown in FIGS. 3 and 4, a control panel 400 may be located on the controller case 200 adjacent to the storage compartment 210.

In some embodiments, the device 100 may comprise a display screen 470 which may be movably coupled to a controller case 200 proximate to a control panel 400 so that the display screen 470 may be moved to cover and uncover all or portions of the control panel 400, such as to cover and uncover the plurality of control inputs 429. In this manner, the display screen 470 may be moved, such as by being pivoted or slid, open to expose the display panel 470 and the plurality of control inputs 429 for use.

In some embodiments, a display screen 470 may comprise or be coupled to an upper lid 423 which may contact a wall 420, 421, of the UAV compartment 210 when the display screen 470 is in the closed position 172. Preferably, the upper lid 423 may be made from or may comprise a substantially rigid material so that the upper lid 423 may be suitable for protecting the display screen 470 from impacts and contaminants.

In preferred embodiments, a display panel 470 may be movably coupled to a control panel 400, UAV compartment 210, or other component of the controller case 200, such as a wall 420, 421, via one or more display hinges 475. A display hinge 475 may comprise a butt hinge, piano hinge, barrel hinge, butt/Mortise hinge, case hinge, flag hinge, strap hinge, H hinge, HL hinge, piano hinge, butterfly hinge, flush hinge, barrel hinge, concealed hinge, continuous hinge, T-hinge, strap hinge, double-acting hinge, Soss hinge, counter flap hinge, flush hinge, coach hinge, rising butt hinge, double action spring hinge, tee hinge, friction hinge, security hinge, cranked hinge or stormproof hinge, lift-off hinge, self-closing or self-positioning hinge, flexible material hinge, or any other type or style of hinge or movable coupling.

In further embodiments, the controller case 200 may have one or more display hinges 475 or latches 865 to open a display screen 470 and expose the control panel 400. The controller case 200 may have hinges 475 (such as friction hinges used in laptops) that may connect the lower control panel 400 with the top display screen 470. A latch 865 may removably couple a display screen 470 and/or upper lid 423 to a wall 420, 421, or other component of the UAV compartment 210 so as to maintain the device 100 in the closed position 172.

In some embodiments, the controller case 200 may have depression(s) 471 which may allow the display screen 475 to be recessed into an upper lid 423 to compensate for control inputs 429, such as control knobs, buttons, and joysticks 430, 435, extending above the control panel 400 so that the control inputs 429 do not contact and damage the display screen 470 when it is closed or covering all or portions of the control panel 400.

In some embodiments, the controller case 200 may comprise one or more magnetic inserts 216 optionally located on the two top corners of the display screen 470 and UAV compartment 210, on the display screen 470 side and corresponding magnet inserts 216 located at the two lower corners of the control panel 400 as a means for closing/shutting the display screen 470.

Figure 13:
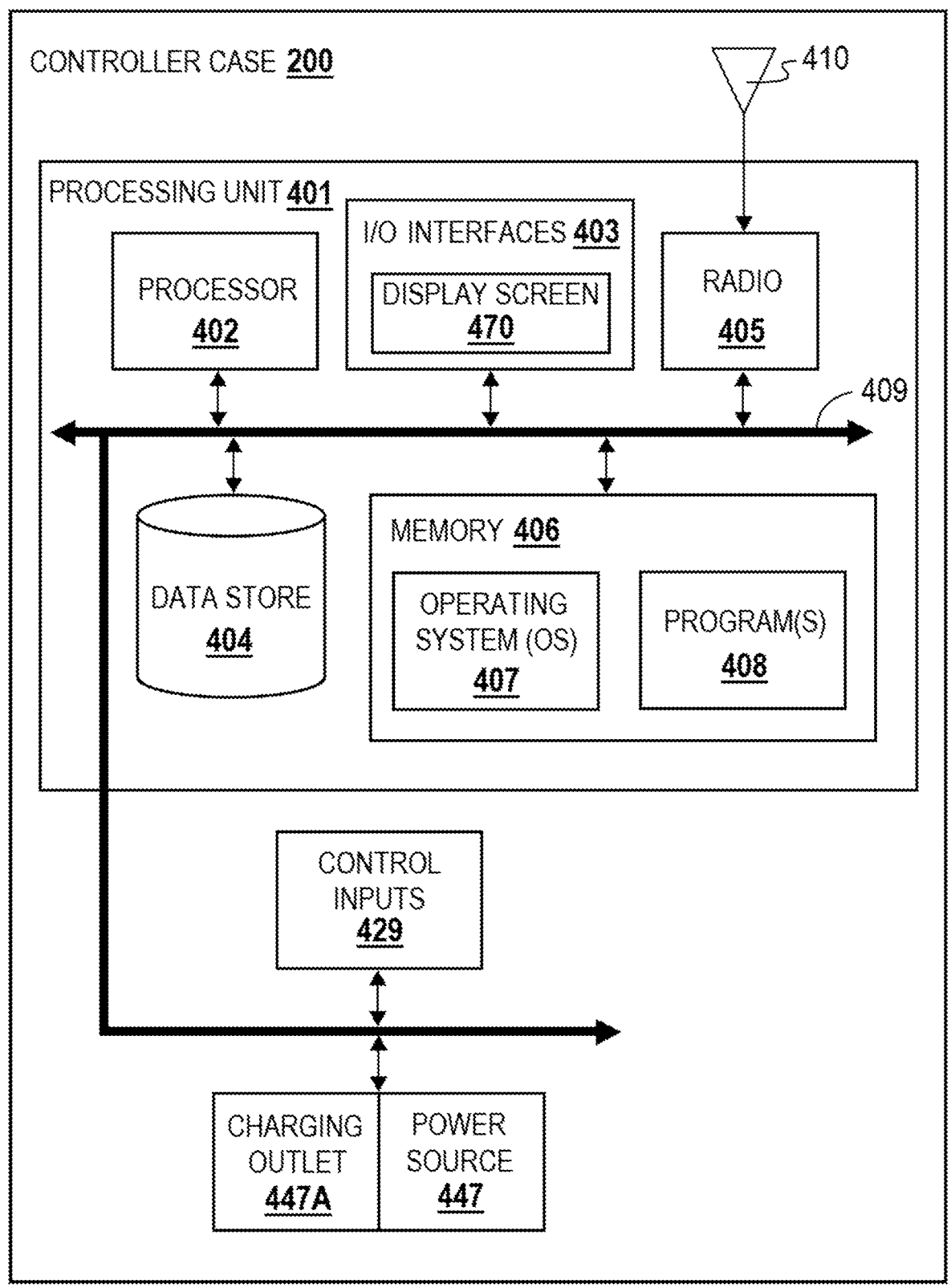
FIG. 13 shows a block diagram of an example of a controller case according to various embodiments described herein.

In preferred embodiments, the controller case 200 can be a digital device that, in terms of hardware architecture, may optionally comprise one or more processing units 401 which may control the functions of one or more elements of the controller case 200 and preferably one or more functions of the UAV 300 that the controller case 200 is in communication with. It should be appreciated by those of ordinary skill in the art that FIG. 13 depicts an example of the controller case 200 in an oversimplified manner, and a practical embodiment may include additional components or elements and suitably configured processing logic to support known or conventional operating features that are not described in detail herein. It should also be appreciated that a processing unit 401 may be configured as a RC controller or RC remote controller so that the processing unit 401 may not utilize an operating system 407, programs 408, or other computing code.

The components and elements of the controller case 200 may be communicatively coupled via a local interface 409. The local interface 409 can be, for example but not limited to, one or more buses or other wired or wireless connections, as is known in the art. The local interface 409 can have additional elements, which are omitted for simplicity, such as controllers, buffers (caches), drivers, repeaters, and receivers, among many others, to enable communications. Further, the local interface 409 may include address, control, and/or data connections to enable appropriate communications among the aforementioned components. In some embodiments, the local interface 409 may comprise wiring connection optionally located between or within the hinge(s) 475 connecting a lower control panel 400 with the top display screen 470 and/or UAV compartment 210. Wiring connection between the control panel 400 and display screen 470 and/or UAV compartment 210 can use thin flexible wiring such as printed flexible circuit boards that connect and adjoin the control panel 400 with the display screen 470 and/or UAV compartment 210. This flexible wiring optionally may be partially exposed or imbedded within the device.

In some embodiments, a processing unit 401 may comprise one or more processors 402, I/O interfaces 403, radio modules 405, data stores 404, and/or memory 406. The processor 402 is a hardware device for executing software instructions. The processor 402 can be any custom made or commercially available processor, a central processing unit (CPU), an auxiliary processor among several processors, a semiconductor-based microprocessor (in the form of a microchip or chip set), or generally any device for executing software instructions. When in operation, the processor 402 may be configured to execute software stored within the memory 406, to communicate data to and from the memory 402, and to generally control operations of the device controller case 200 and UAV 300 pursuant to the software instructions. In an exemplary embodiment, the processor 402 may include a mobile optimized processor such as optimized for power consumption and mobile applications.

The I/O interfaces 403 can be used to input and/or output information and power. In some embodiments, I/O interfaces 403 may include one or more turnable control knobs, depressible button type switches, a key pad, slide type switches, dip switches, rocker type switches, rotary dial switches, numeric input switches or any other suitable input which a user 101 may interact with to provide input. In further embodiments, I/O interfaces 403 may include one or more light emitting elements 480 or other display device, e.g., a LED (light emitting diodes), a speaker for output sound recorded by an audio interface 485 of a UAV 300, or any other suitable device for outputting or displaying information. The I/O interfaces 403 can also include, for example, a serial port, a parallel port, a small computer system interface (SCSI), an infrared (IR) interface, a radio frequency (RF) interface, a universal serial bus (USB) interface, and the like.

In preferred embodiments, an I/O interface 403 may comprise a display screen 470, and a controller case 200 preferably may comprise one or more display screens 470. In further preferred embodiments, a display screen 470 may be configured to output data or video recorded by a camera 310 of a UAV 300 that the processing unit is in communication with. In further embodiments, a controller case 200 may comprise one or more display screens 470 which may be configured to output other information and data, such as a telemetry data, and other data received from the UAV camera 310.

A display screen 470 may comprise any type of visual display device, such as a Liquid crystal display (LCD), Light-emitting diode display (LED), Electroluminescent display (ELD), Electronic paper, E Ink, Plasma display panel (PDP), Cathode ray tube display (CRT), High-Performance Addressing display (HPA), Thin-film transistor display (TFT), Organic light-emitting diode display (OLED), Surface-conduction electron-emitter display (SED), Laser TV, Carbon nanotubes, Quantum dot display, Interferometric modulator display (IMOD), and/or any other device or method which may be configured to provide or communicate visual information to a user 101.

In some embodiments, a control case 200 may have a radio module 405 that may comprise a first transceiver and the UAV 300 may have a radio module 325 that may comprise a second transceiver so that two-way communication occurs between the control case 200 and the UAV 300. Two-way communication allows the processing unit 401 to send flight control information to the UAV 300 and allows the UAV 300 to send data obtained from a camera 310, audio interface 485, or other element on board the UAV 300 to the processing unit 401.

Generally, a radio module 405 may enable wireless communication to an external access device or network through an antenna. A radio module 405 may comprise a wireless communication receiver and a wireless communication transmitter. In some embodiments, a radio module 405 may operate on VHF or UHF frequency bands. In further embodiments, a radio module 405 may operate on one of the most common frequencies used for video transmission, such as 900 MHz, 1.2 GHz, 2.4 GHz, and 5.8 GHz, or any other frequency. Optionally, a radio module 405 may operate on specialized long-range UHF frequencies, such as 433 MHz and 869 MHz. Any number of suitable wireless data communication protocols, techniques, or methodologies can be supported by the radio module 405, including, without limitation: RF; IrDA (infrared); Bluetooth; ZigBee (and other variants of the IEEE 802.15 protocol); IEEE 802.11 (any variation such as WiFi); IEEE 802.16 (WiMAX or any other variation); Direct Sequence Spread Spectrum; Near-Field Communication (NFC); Frequency Hopping Spread Spectrum; Long Term Evolution (LTE); cellular/wireless/cordless telecommunication protocols (e.g. 3G/4G, etc.); wireless home network communication protocols; paging network protocols; magnetic induction; satellite data communication protocols; wireless hospital or health care facility network protocols such as those operating in the WMTS bands; GPRS; proprietary wireless data communication protocols such as variants of Wireless USB; and any other protocols for wireless communication.

The controller case 200 may have an antenna 410 located anywhere on the controller case 200, such as proximate to the display screen 470 and/or control panel 400. Preferably, an antenna 410 may be located in a thin narrow cavity as such to house the antenna 410. An antenna 410 storage housing may be adjacent to the display screen 470 and at the furthermost edge of the case 200. The antenna 410 may be permanently attached to the connector below it or it may be removable by unscrewing.

Figure 7:
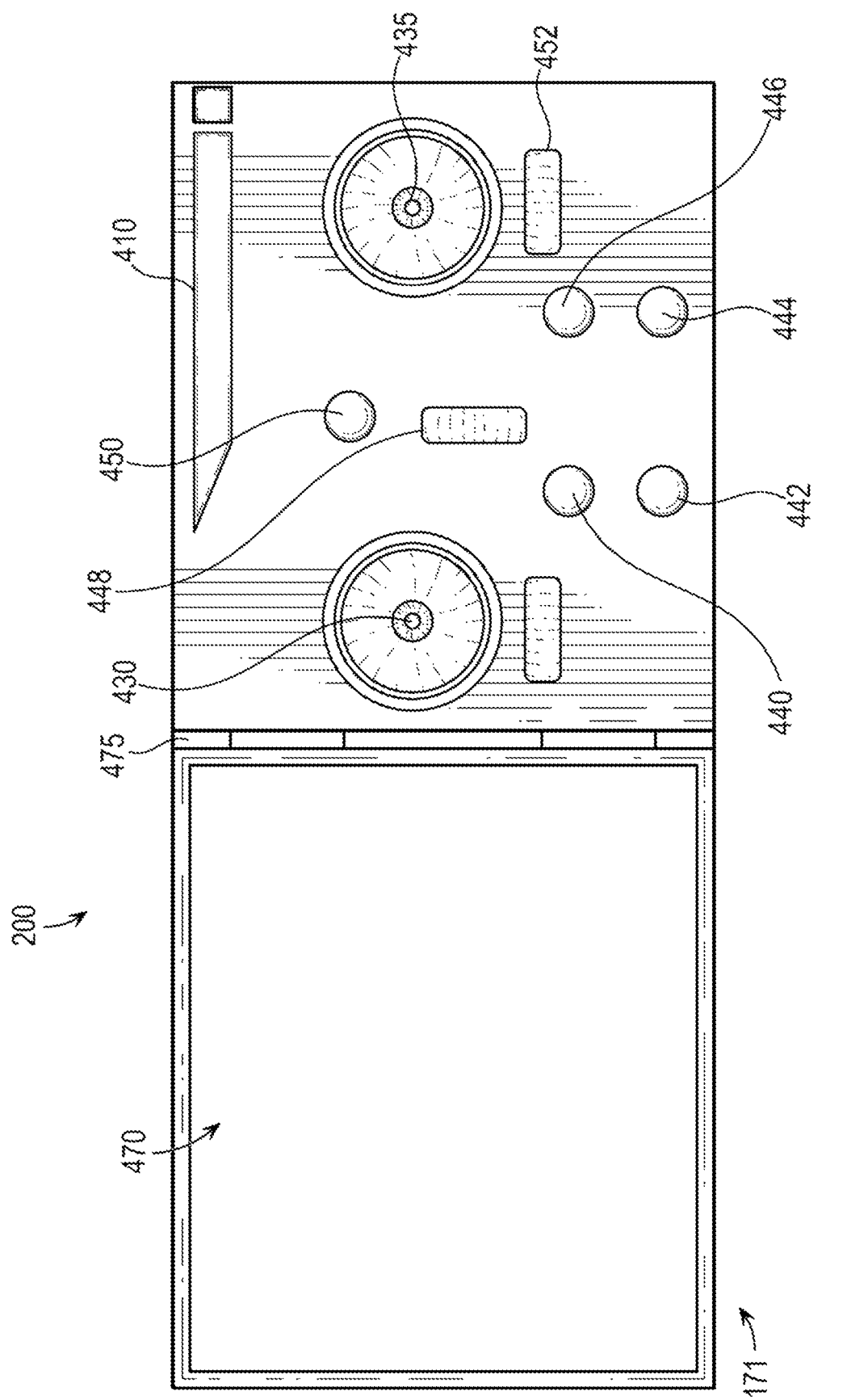
FIG. 7 shows a top plan view of an example of a controller case having a display screen in an open position according to various embodiments described herein.
Figure 8:
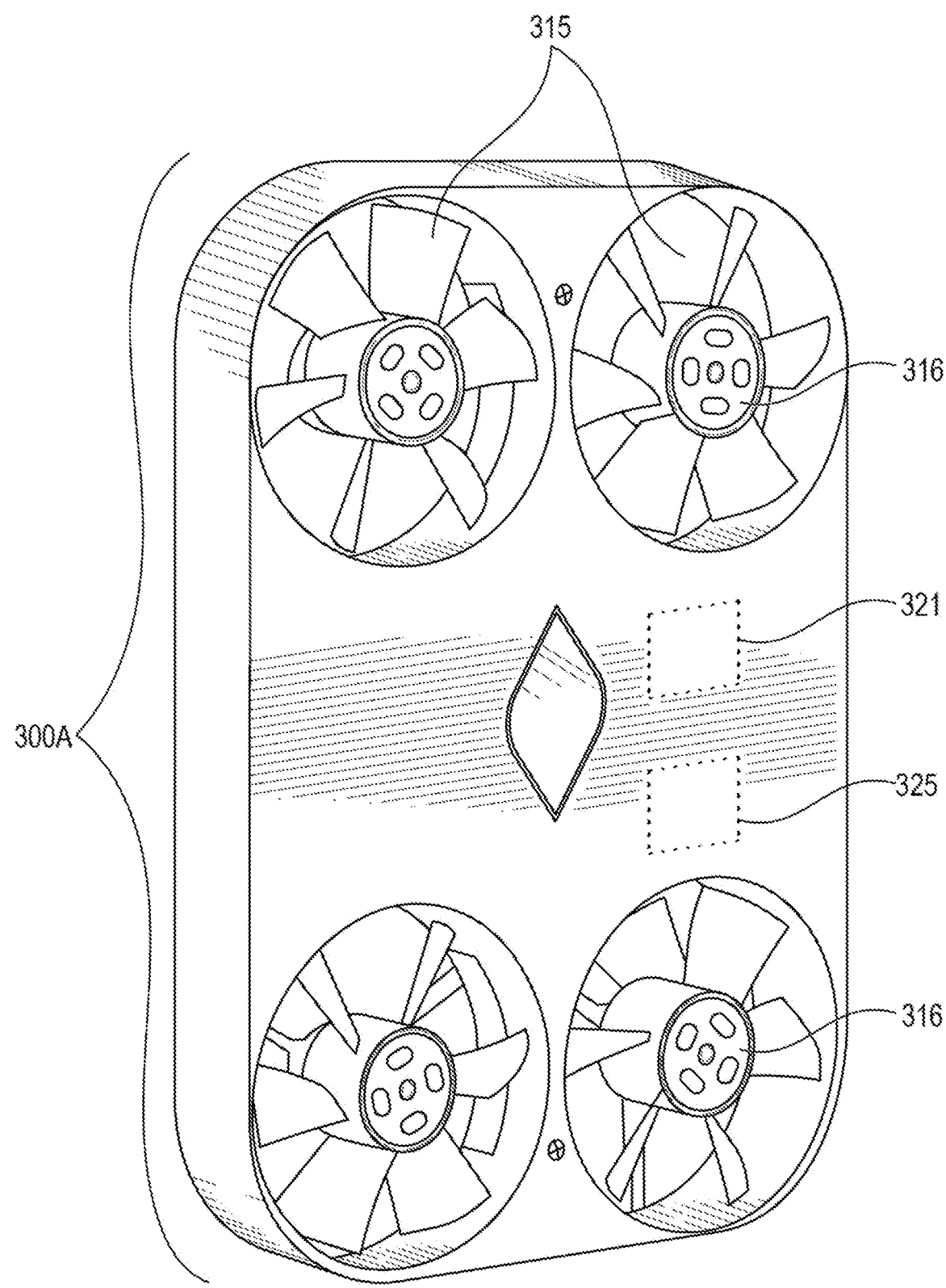
FIG. 8 illustrates a perspective view of an example of a fixed wing UAV according to various embodiments described herein.
Figure 10:
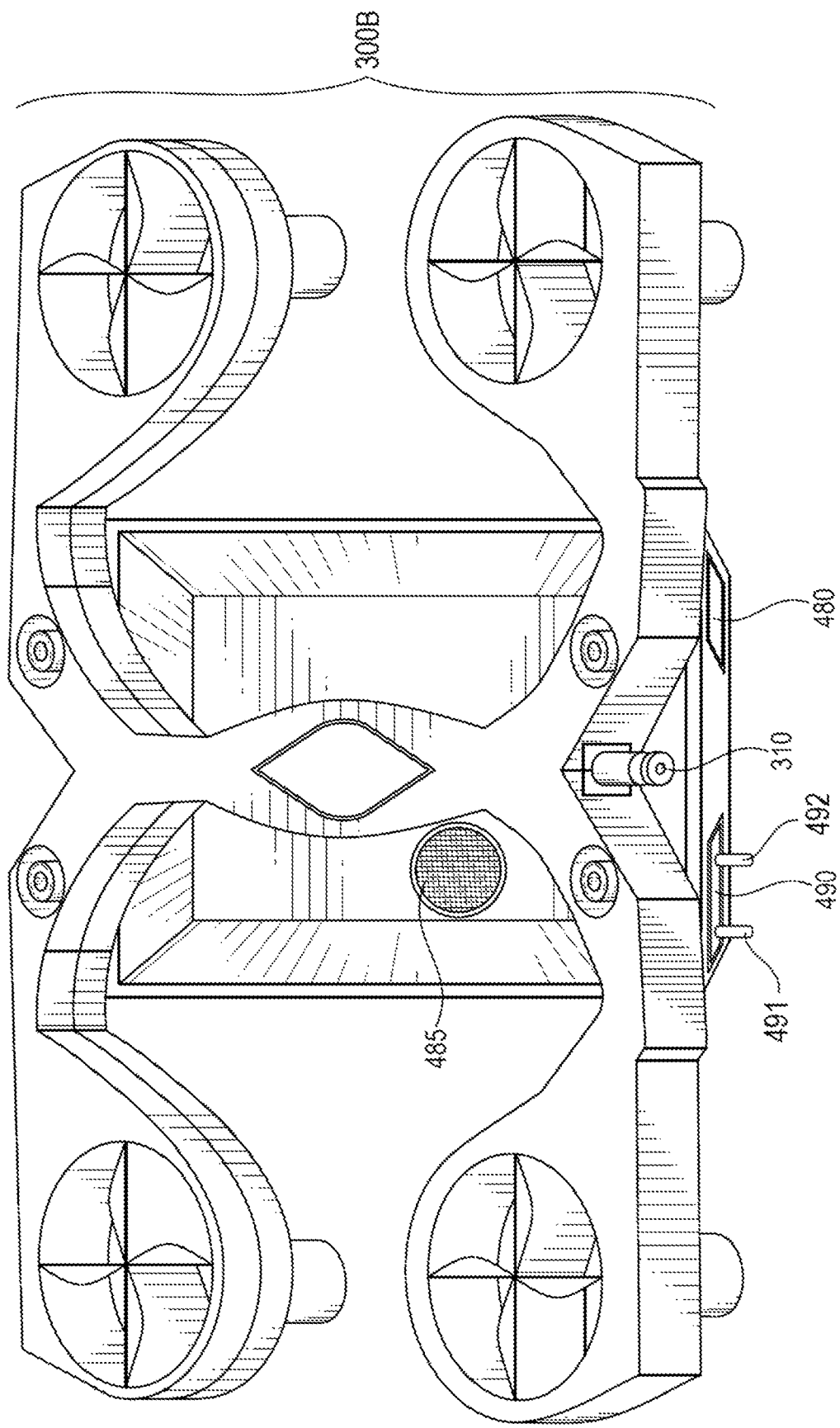
FIG. 10 shows a perspective view of another example of a folding wing UAV having its wing arms in a deployed position according to various embodiments described herein.
Figure 11:
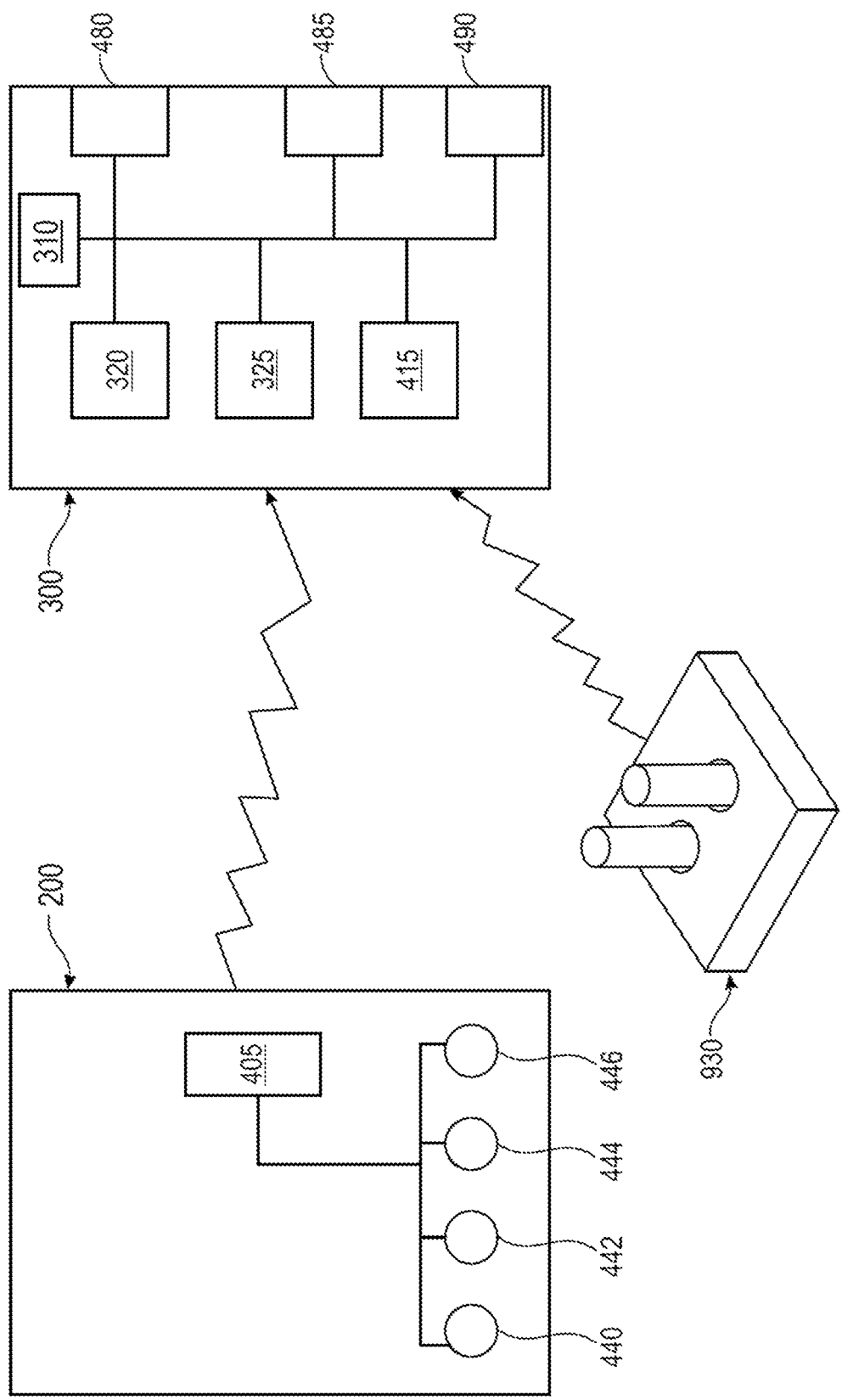
FIG. 11 illustrates a block diagram of an example of a UAV controller device according to various embodiments described herein.
Figure 12:
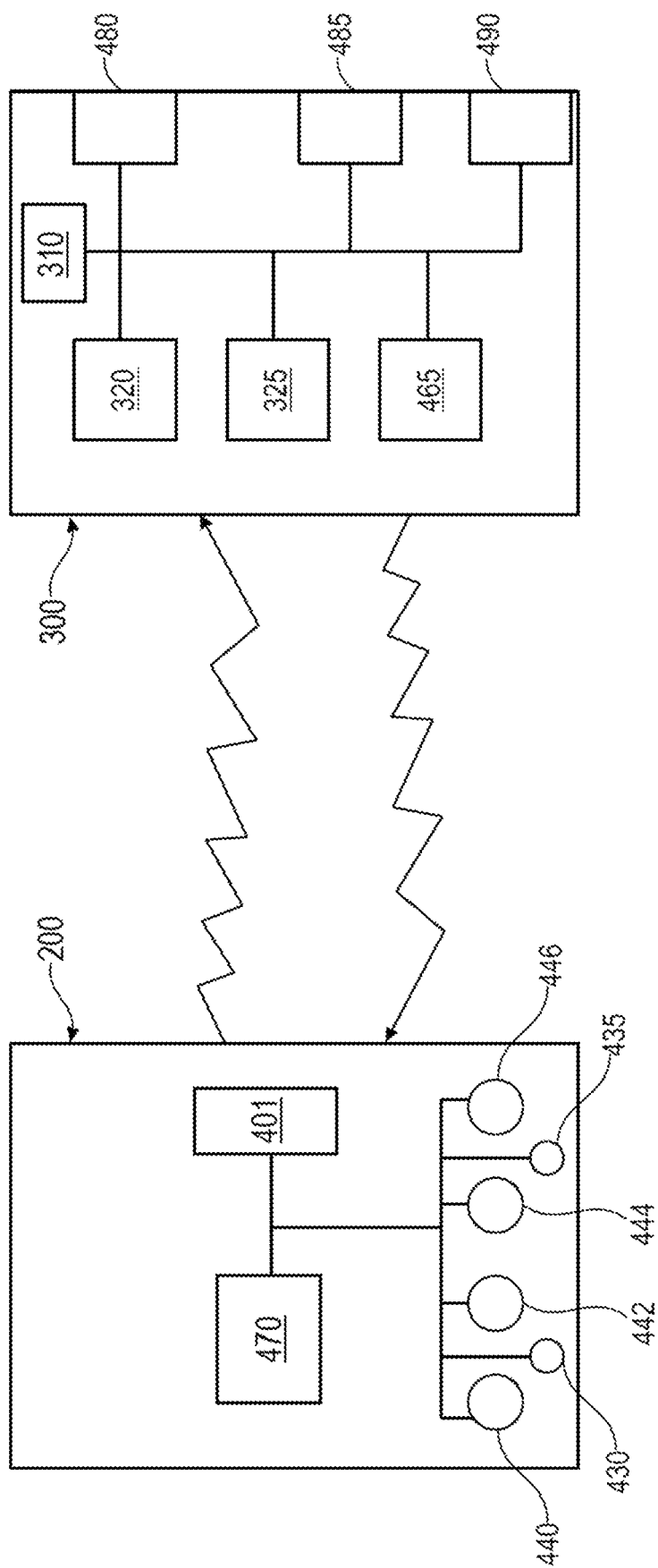
FIG. 12 depicts a block diagram of another example of a UAV controller device according to various embodiments described herein.

In some embodiments, an antenna 410 may be located within a hollowed-out cavity located in left corner at the base of the controller case 200 as shown in FIG. 7. The antenna 410 tip may slightly protrude from the controller case 200 for ease of pulling up or extending portions of the antenna 410. The antenna 410 may be connected to the wiring that may come through the hollowed-out antenna storage cavity at the bottom of the cavity and run down to the wiring connection point that runs to the radio module 405.

The data store 404 may be used to store data. The data store 404 may include any of volatile memory elements (e.g., random access memory (RAM, such as DRAM, SRAM, SDRAM, and the like)), nonvolatile memory elements (e.g., ROM, hard drive, tape, CDROM, and the like), and combinations thereof. Moreover, the data store 404 may incorporate electronic, magnetic, optical, and/or other types of storage media.

The memory 406 may include any of volatile memory elements (e.g., random access memory (RAM, such as DRAM, SRAM, SDRAM, etc.)), nonvolatile memory elements (e.g., ROM, hard drive, etc.), and combinations thereof. Moreover, the memory 406 may incorporate electronic, magnetic, optical, and/or other types of storage media. Note that the memory 406 may have a distributed architecture, where various components are situated remotely from one another, but can be accessed by the processor 402. The software in memory 406 can include one or more software programs, each of which includes an ordered listing of executable instructions for implementing logical functions. In the example of FIG. 13, the software in the memory system 406 may include a suitable operating system (O/S) 407 and programs 408.

An operating system 407 essentially controls the execution of input/output interface 403 functions, and provides scheduling, input-output control, file and data management, memory management, and communication control and related services. The operating system 407 may be, for example, LINUX (or another UNIX variant) and any Linux-kernel-based operating systems, Raspbian, Ubuntu, OpenELEC, RISC OS, Arch Linux ARM, OSMC (formerly Raspbmc) and the Kodi open source digital media center, Pidora (Fedora Remix), Puppy Linux, Android (available from Google), Symbian OS, Microsoft Windows CE, Microsoft Windows 7 Mobile, iOS (available from Apple, Inc.), webOS (available from Hewlett Packard), Blackberry OS (Available from Research in Motion), and the like. The programs 408 may include various applications, add-ons, etc. configured to provide end user functionality such as to control the operation of functions of the UAV 300.

In some embodiments, the controller case 200 may comprise one or more control inputs 429 coupled to the control panel 400 that a user 101 may interact with, such as turnable control knobs, depressible button type switches, a key pad, slide type switches, rocker type switches, touch screen graphical user interfaces (GUI), or any other suitable input that may be used to modulate electricity between components or to otherwise control functions of the processing unit 401, UAV 300, or other elements of the device 100. The plurality of control inputs 429 may comprise one or more trim controls 452 to establish straight and level flight of the UAV 300 when the first joystick 430 and/or the second joystick 435 are not being activated, a power control 448 to turn the control panel 400 off and on, and a power indicator 450 to indicate when the control panel 400 is powered. A control input 429 may comprise a camera control 440. Interaction with the camera control 440 may cause the processing unit 401 to activate the camera 310 to take the still photo or the video. As a non-limiting example, the interaction may take the form of a momentary or prolonged depression of the camera control 440, initiating a transmission from the processing unit 401 to the UAV 300. The controller case 200 may comprise a transmitter or radio module 405 communicatively coupled to the UAV 300 and the plurality of operator controls that are adapted to control the UAV based upon manipulation of the plurality of operator controls or control inputs 429 operable by a user 101. The radio module 405 may be communicatively linked to a radio module 325 or receiver located within the UAV 300 such that activation of any of the plurality of control inputs 429 on the control panel 400 is communicated to the UAV 300 and may result in a response by the UAV 300.

In some embodiments, a control input 429 may comprise a first joystick 430 and a second joystick 435 for controlling the flight of the UAV 300. As non-limiting examples, the first joystick 430 may control pitch and yaw of the UAV 300 and the second joystick 435 may control throttle and roll of the UAV 300.

In some embodiments, the controller case 200 may comprise a power source 447 which may provide electrical power to any component of the device 100 that may require electrical power. A power source 447 may comprise a battery, such as a lithium ion battery, nickel cadmium battery, alkaline battery, or any other suitable type of battery, a fuel cell, a capacitor, a super capacitor, or any other type of energy storing and/or electricity releasing device. In further embodiments, a power source 447 may comprise a power cord, kinetic or piezo electric battery charging device, a solar cell or photovoltaic cell, and/or inductive charging or wireless power receiver. In further embodiments, a power source 447 may comprise a power charging and distribution module which may be configured to control the recharging of the power source 447, discharging of the power source 447, and/or distribution of power to one or more components of the controller case 200 and/or UAV 300 that may require electrical power. In some embodiments, a surface or wall 420, 421, 422, of the UAV compartment 210 may comprise a power source 447 configured as a wireless charging mechanism which may be used as an alternative to a wired charging system to recharge a UAV power source 340. In this manner, the power source 447 may be configured to provide wireless charging to the UAV power source 340. The controller case 200 may have a removable or non-removable power source 447.

In some embodiments, a UAV compartment 210 can include a power source 447 which may comprise a charging outlet 447A or plug that may connect to the UAV power source 340 for communicating power to the UAV power source 340. This method may also be used to secure the UAV 300 within the controller case 200, similar to cell phone case charger. In preferred embodiments, a charging outlet 447A may comprise a USB connector such as a female micro-USB or female mini-USB. In other embodiments, a power input plug member 15 may comprise a male or female Type A USB plug, a Type B USB plug, a Mini-A USB plug, a Mini-B USB plug, a Micro-A USB plug, a Micro-B USB plug, a Micro-B USB 3.0 plug, a ExtMicro USB plug, a Lightning plug, a 30-pin dock connector, a Pop-Port connector, a Thunderbolt plug, a Firewire plug, a Portable Digital Media Interface (PDMI) plug, a coaxial power connector plug, a barrel connector plug, a concentric barrel connector plug, a tip connector plug, or any other plug, connector, or receptacle capable of enabling electrical communication.

In some embodiments, a power source 447 may comprise a power tether cord that can be connected to the UAV 300 for extended flight endurance and/or for enabling electronic communication between the controller case 200 and the UAV 300. A power source 447 configured as a power tether cord may be stored inside the accessory compartment. An external battery can also be used for the purposes of extended flight times.

Figure 14:
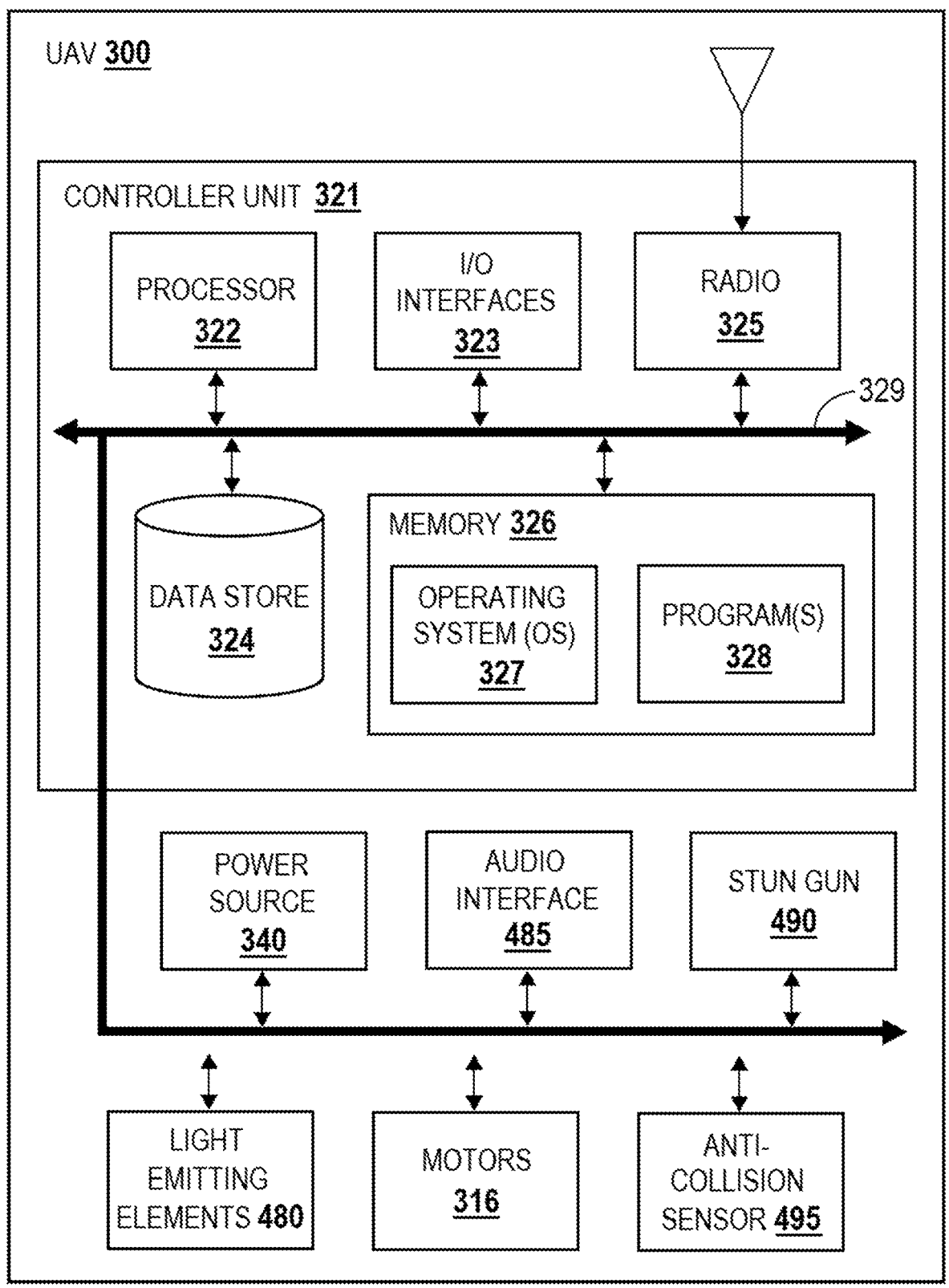
FIG. 14 illustrates a block diagram of an example of a UAV according to various embodiments described herein.

The device 100 may comprise one or more UAVs 300 which may be configured as an unmanned flying and/or non-flying vehicle. For example, a UAV 300 may be configured as a fixed wing UAV having less than four propellers 315 or more specifically used traditional means of aerodynamic flight requiring air foil shaped wings to enable flight and may not have vertical landing and takeoff abilities. As another example, a UAV 300 may be configured with one or more wheels, tracks, legs, or other means of terrestrial movement or locomotion, such as a hybrid UAV/rover having a number of wheels. It should be understood that a UAV outer shell storage casing 540 may house UAVs 300 having means of terrestrial movement or locomotion and/or flight based movement or locomotion to secure the UAVs 300 within the UAV compartment 210. The functions of the elements of a UAV 300 may be controlled by one or more controller units 321. In its simplest form, a controller unit 321 may comprise a radio module 325, capable of communicating with a radio module 405 of the controller case, that sends signals to servomechanisms (servos), motors 316, and other elements of the UAV 300. In preferred embodiments, the UAV 300 can be a digital device that, in terms of hardware architecture, may optionally comprise one or more controller units 321 which may control the functions of one or more elements of the UAV 300 that the controller case 200 is in communication with. It should be appreciated by those of ordinary skill in the art that FIG. 14 depicts an example of the UAV 300 in an oversimplified manner, and a practical embodiment may include additional components or elements and suitably configured processing logic to support known or conventional operating features that are not described in detail herein. It should also be appreciated that a controller unit 321 may be configured as a RC controller or RC remote controller so that the UAV 300 may not utilize an operating system 327, programs 328, or other computing code.

The components and elements of the UAV 300 may be communicatively coupled via a local interface 329. The local interface 329 can be, for example but not limited to, one or more buses or other wired or wireless connections, as is known in the art. The local interface 329 can have additional elements, which are omitted for simplicity, such as controllers, buffers (caches), drivers, repeaters, and receivers, among many others, to enable communications. Further, the local interface 329 may include address, control, and/or data connections to enable appropriate communications among the aforementioned components.

In some embodiments, a controller unit 321 may comprise one or more processors 322, I/O interfaces 323, radio modules 325, data stores 324, and/or memory 326. The processor 322 is a hardware device for executing software instructions. The processor 322 can be any custom made or commercially available processor, a central processing unit (CPU), an auxiliary processor among several processors, a semiconductor-based microprocessor (in the form of a microchip or chip set), or generally any device for executing software instructions. When in operation, the processor 322 may be configured to execute software stored within the memory 326, to communicate data to and from the memory 326 and data stores 324, and to generally control operations of the UAV 300 pursuant to the software instructions. In an exemplary embodiment, the processor 322 may include a mobile optimized processor such as optimized for power consumption and mobile applications.

The I/O interfaces 323 can be used to input and/or output information and power. In some embodiments, I/O interfaces 323 may include one or more turnable control knobs, depressible button type switches, a key pad, slide type switches, dip switches, rocker type switches, rotary dial switches, numeric input switches or any other suitable input which a user 101 may interact with to provide input. The I/O interfaces 323 can also include, for example, a serial port, a parallel port, a small computer system interface (SCSI), an infrared (IR) interface, a radio frequency (RF) interface, a universal serial bus (USB) interface, and the like.

Generally, a radio module 325 may enable wireless communication to a controller case 200, an external access device, and/or network through an antenna. A radio module 325 may comprise a wireless communication receiver and a wireless communication transmitter. In some embodiments, a radio module 325 may operate on VHF or UHF frequency bands. In further embodiments, a radio module 325 may operate on one of the most common frequencies used for video transmission, such as 900 MHz, 1.2 GHz, 2.4 GHz, and 5.8 GHz, or any other frequency. Optionally, a radio module 325 may operate on specialized long-range UHF frequencies, such as 433 MHz and 869 MHz. Any number of suitable wireless data communication protocols, techniques, or methodologies can be supported by the radio module 325, including, without limitation: RF; IrDA (infrared); Bluetooth; ZigBee (and other variants of the IEEE 802.15 protocol); IEEE 802.11 (any variation such as WiFi); IEEE 802.16 (WiMAX or any other variation); Direct Sequence Spread Spectrum; Near-Field Communication (NFC); Frequency Hopping Spread Spectrum; Long Term Evolution (LTE); cellular/wireless/cordless telecommunication protocols (e.g. 3G/4G, etc.); wireless home network communication protocols; paging network protocols; magnetic induction; satellite data communication protocols; wireless hospital or health care facility network protocols such as those operating in the WMTS bands; GPRS; proprietary wireless data communication protocols such as variants of Wireless USB; and any other protocols for wireless communication.

The data store 324 may be used to store data. The data store 404 may include any of volatile memory elements (e.g., random access memory (RAM, such as DRAM, SRAM, SDRAM, and the like)), nonvolatile memory elements (e.g., ROM, hard drive, tape, CDROM, and the like), and combinations thereof. Moreover, the data store 324 may incorporate electronic, magnetic, optical, and/or other types of storage media.

The memory 326 may include any of volatile memory elements (e.g., random access memory (RAM, such as DRAM, SRAM, SDRAM, etc.)), nonvolatile memory elements (e.g., ROM, hard drive, etc.), and combinations thereof. Moreover, the memory 406 may incorporate electronic, magnetic, optical, and/or other types of storage media. Note that the memory 406 may have a distributed architecture, where various components are situated remotely from one another, but can be accessed by the processor 322. The software in memory 406 can include one or more software programs, each of which includes an ordered listing of executable instructions for implementing logical functions. In the example of FIG. 14, the software in the memory system 326 may include a suitable operating system (O/S) 327 and programs 328.

An operating system 327 essentially controls the execution of input/output interface 323 functions, and provides scheduling, input-output control, file and data management, memory management, and communication control and related services. The operating system 327 may be, for example, LINUX (or another UNIX variant) and any Linux-kernel-based operating systems, Raspbian, Ubuntu, OpenELEC, RISC OS, Arch Linux ARM, OSMC (formerly Raspbmc) and the Kodi open source digital media center, Pidora (Fedora Remix), Puppy Linux, Android (available from Google), Symbian OS, Microsoft Windows CE, Microsoft Windows 7 Mobile, iOS (available from Apple, Inc.), webOS (available from Hewlett Packard), Blackberry OS (Available from Research in Motion), and the like. The programs 328 may include various applications, add-ons, etc. configured to provide end user functionality such as to control the operation of functions of the UAV 300.

In some embodiments, a UAV 300 may comprise one or more propellers 315 may be rotated to generate thrust or other method of propulsion. Preferably, each propeller 315 may be motivated or rotated by a motor 316. The motors 316 may be controlled by the controller unit 321, preferably via commands received from the controller case 200. In some embodiments, a motor 316 may comprise a brushed DC motor, brushless DC motor, switched reluctance motor, universal motor, AC polyphase squirrel-cage or wound-rotor induction motor, AC SCIM split-phase capacitor-start motor, AC SCIM split-phase capacitor-run motor, AC SCIM split-phase auxiliary start winding motor, AC induction shaded-pole motor, wound-rotor synchronous motor, hysteresis motor, synchronous reluctance motor, pancake or axial rotor motor, stepper motor, or any other type of motor. In further embodiments, a motor 316 may comprise a hydraulic motor such as a Gear and vane motor, Gerotor motor, Axial plunger motors, Radial piston motors, or any other hydraulically motivated motor. In still further embodiments, a motor 316 may comprise a pneumatic motor, such as a linear pneumatic motor and a pneumatic rotary vane motor.

The UAV 300 may perform vertical takeoffs and landings. In a preferred embodiment, the UAV 300 may comprise four propellers 315 in a configuration known as a quadcopter. The UAV 300 may change its orientation, speed, altitude, direction of travel, or combinations thereof by changing the rotational speed of one or more of the propellers 315. The UAV 300 may hover in a fixed position by adjusting the speed of the propellers 315 to eliminate any pitch, yaw, roll, forward motion, backward motion, or lateral motion. The UAV 300 may comprise one or more controller units 321 that may control the rotational speed of the propellers 315 so as to autonomously maintain the flight characteristics of the UAV 300 or to change the flight characteristics in response to input received from the control panel 400. In some embodiments, a UAV 300 may be comprised of a lower component 361 and upper component 362. Both lower 361 and upper 362 component may house all the electronic and mechanical parts for the UAV's 300 operation.

The controller case 200 and UAV 300 may use materials that are more desirable for applications that are non-terrestrial in nature. As such the UAV 300 may use multiple propulsion systems such as pulsed, thermal, continuous fission, ion drive technology or any other means of propulsion that is suitable to such an environment. The UAV 300 may more commonly use micro-thrusters as a replacement for propellers when being used in non-terrestrial applications. As such the control panel 400 control inputs 429 will engage directional changes, thrust variations and other required control inputs.

A UAV 300 may be configured as a fixed wing UAV 300A or a folding wing UAV 300B. A fixed wing UAV 300A may generally comprise propellers 315 residing at fixed locations on the UAV 300. For example, the UAV 300A may comprise one or more wing arms 365 to which the propellers 315 may be coupled, and the wing arms 365 may not be movable.

In some embodiments, a UAV 300 may comprise a folding wing UAV 300B having one or more propellers 315 residing on one or more movable wing arms 365. For example, a wing arm 365 may comprise a portion of the UAV 300B that is hingedly coupled to the remainder of the UAV 300B via a wing hinge 380. One or more of the wing arms 365 may be moved from a storage position 370 to a deployed position 375 prior to being launched. In the deployed position 375 the wing arms 365 and their propellers 315 are separated farther from each other which gives the UAV 300B greater stability. Each of the wing arms 365 may be moved between the storage position 370 and the deployed position 375 either manually or mechanically for example through action of one or more servomotors located on the UAV 300B or through a spring-loaded release or other mechanism. UAV 300B can have wing hinges 380 which may be configured as any type of hinge (such as described for display hinges 475) or other movable coupling, such as high tension spring hinges, that control the wing arms 365 and automatically open upon removal/released from/of an enclosed space such as the UAV compartment 210. In other embodiments, a UAV wing arm 365 may use any suitable method for opening and closing the wing arms 365.

In preferred embodiments, a UAV 300 may comprise a finger grip 390 which may be comprise a non-slip surface. The finger grip 390 may be positioned anywhere on the UAV 300, such as in the center area of the UAV and provide a means for a user 101 to quickly grip and slide the UAV 300 out of a UAV compartment 210 of the controller case 200.

In preferred embodiments, a UAV 300 may comprise a camera 310 for taking photos and/or recording video. The camera 310 may point in a forward and/or downward direction or any other direction. Optionally, a camera 310 may be movably coupled to an element of the UAV 300. The UAV 300 may save the still photo or the video recorded by a camera 310 in a data store 324 communicatively coupled to the camera 310. In some embodiments, the UAV 300 may transmit the still photo or the video recorded by a camera 310 to the processing unit 401 for display on the display panel 470. In preferred embodiments, a camera 310 may comprise a digital camera that encodes images and videos digitally on a charge-coupled device (CCD) image sensor or on a complementary metal-oxide-semiconductor (CMOS) image sensor and stores them for later reproduction. In other embodiments, a camera 310 may comprise any type of camera which includes an optical system, typically using a lens with a variable diaphragm to focus light onto an image pickup device or image sensor.

The UAV may comprise one or more light emitting elements 480. The one or more light emitting elements 480 may illuminate the area in front and/or around the UAV 300 and/or in front of the camera 310. Preferably, one or more light emitting elements 480 may be configured as a light bar, spot light, flood light, strobe light, or any other lighting arrangement. The control panel 400 may comprise a control input 429 configured as a lighting control 442 to activate the one or more light emitting elements 480. The one or more light emitting elements 480 may be configured to illuminate with various colors and intensities of light allowing a plurality of color patterns and intensity patterns to be generated by the UAV 300. In some embodiments, a light emitting element 480 may comprise a light emitting diode (LED) which may be configured to provide light of various wavelengths and intensities. In other embodiments, a light emitting element 480 may comprise an organic light-emitting diode (OLED), incandescent light bulb, fluorescent light, bulb halogen light bulb, high-intensity discharge light bulb, laser light emitter, electroluminescent light source, neon light source, or any other type of suitable light source.

The UAV 300 may comprise an audio interface 485. An audio interface 485 may be configured to record and/or output sound. In preferred embodiments, an audio interface 485 may comprise an audio transducer. In further preferred embodiments, an audio interface 485 may produce an audible alarm sound. In some embodiments, the UAV 300 may comprise an audio interface 485 that may be configured as a high decibel sound device that can be positioned on the lower component 361 of the UAV 300 which may be pointed towards the ground. The audio interface 485 alert may activate in response to a user 101 interacting with a control input 429 on the control panel 400. In preferred embodiments, a control panel 400 may comprise a control input 429 that may be configured as a panic alert control 444 to activate the audio interface 485. In some embodiments, the audio interface 485 may play audio transmitted to the UAV 300 from a microphone located on the control panel 400. In some embodiments, the panic alert control 444 may activate multiple systems of the UAV 300. As a non-limiting example, the panic alert control 444 may activate lighting, audible sound, and video recording subsystems simultaneously.

In some embodiments, the UAV 300 may comprise a stun gun 490. The stun gun 490 may be configured to immobilize anyone in front of the stun gun 490 using an electroshock. In preferred embodiments, a stun gun 490 may be positioned in the center and lower component 361 of the UAV 300 so that the two output terminals 491, 492, become exposed and protruding from the front of the UAV 300 when engaged be depressing one of the buttons 245 on the control panel 400.

The UAV 300 can have stun gun or taser device 490 for incapacitating a human or other living or non-living targets by generating a series of powerful electrical output pulses across first 491 and second 492 spaced apart output terminals in response to depressing a control input 429 on the control panel 400. The stun gun 490 may have a rechargeable battery or other power source independent of the UAV 300 within the stun gun 490. The control panel 400 may comprise a stun gun control 446 to activate the stun gun 490.

In some embodiments, a UAV 300 may comprise an anti-collision sensor 495 which may be used to detect objects and their proximity to the UAV 300 so prevent the UAV 300 from colliding with objects. Example, anti-collision sensors 495 utilize infrared object detection, ultrasonic object detection, radar object detection, lidar object detection, laser range finding, or any other object detection method.

In some embodiments, the UAV 300 may comprise a power source 340 which may provide electrical power to any component of the device 100 that may require electrical power. A power source 340 may comprise a battery, such as a lithium ion battery, nickel cadmium battery, alkaline battery, or any other suitable type of battery, a fuel cell, a capacitor, a super capacitor, or any other type of energy storing and/or electricity releasing device. In further embodiments, a power source 340 may comprise a power cord, kinetic or piezo electric battery charging device, a solar cell or photovoltaic cell, and/or inductive charging or wireless power receiver. In further embodiments, a power source 340 may comprise a power charging and distribution module which may be configured to control the recharging of the power source 340, discharging of the power source 340, and/or distribution of power to one or more components of the UAV 300 that may require electrical power.

While some exemplary shapes and sizes have been provided for elements of the device 100, it should be understood to one of ordinary skill in the art that the controller case 200 and its elements, UAV 300 and its elements, and any other element described herein may be configured in a plurality of sizes and shapes including "T" shaped, "X" shaped, square shaped, rectangular shaped, cylinder shaped, cuboid shaped, hexagonal prism shaped, triangular prism shaped, or any other geometric or non-geometric shape, including combinations of shapes. It is not intended herein to mention all the possible alternatives, equivalent forms or ramifications of the invention. It is understood that the terms and proposed shapes used herein are merely descriptive, rather than limiting, and that various changes, such as to size and shape, may be made without departing from the spirit or scope of the invention.

Additionally, while some materials have been provided, in other embodiments, the elements that comprise the device 100 may be made from or may comprise durable materials such as aluminum, steel, other metals and metal alloys, wood, hard rubbers, hard plastics, fiber reinforced plastics, carbon fiber, fiber glass, resins, polymers or any other suitable materials including combinations of materials. Additionally, one or more elements may be made from or comprise durable and slightly flexible materials such as soft plastics, silicone, soft rubbers, or any other suitable materials including combinations of materials. In some embodiments, one or more of the elements that comprise the device 100 may be coupled or connected together with heat bonding, chemical bonding, adhesives, clasp type fasteners, clip type fasteners, rivet type fasteners, threaded type fasteners, other types of fasteners, or any other suitable joining method. In other embodiments, one or more of the elements that comprise the device 100 may be coupled or removably connected by being press fit or snap fit together, by one or more fasteners such as hook and loop type or Velcro® fasteners, magnetic type fasteners, threaded type fasteners, sealable tongue and groove fasteners, snap fasteners, clip type fasteners, clasp type fasteners, ratchet type fasteners, a push-to-lock type connection method, a turn-to-lock type connection method, a slide-to-lock type connection method or any other suitable temporary connection method as one reasonably skilled in the art could envision to serve the same function. In further embodiments, one or more of the elements that comprise the device 100 may be coupled by being one of connected to and integrally formed with another element of the device 100.

Although the present invention has been illustrated and described herein with reference to preferred embodiments and specific examples thereof, it will be readily apparent to those of ordinary skill in the art that other embodiments and examples may perform similar functions and/or achieve like results. All such equivalent embodiments and examples are within the spirit and scope of the present invention, are contemplated thereby, and are intended to be covered by the following claims.

What is claimed is:

1. A UAV controller device, the device comprising:
a control panel having a user control input;
a processing unit in communication with the control input;
a display screen in communication with the processing unit;
a side wall coupled to a proximal wall and to a distal wall, the side wall, proximal wall, and distal wall forming a storage compartment, a recess comprising an opening extending throughout a portion of the distal wall and exposing a portion of the storage compartment, the storage compartment having a storage cavity for removably receiving a UAV, the UAV in wireless communication with the processing unit and the recess configured to allow a user to manipulate the removal of the UAV from the storage cavity; and
a camera, for recording video, coupled to the UAV, wherein video recorded by the camera is displayed on the display screen, and wherein the control input governs movement of the UAV.

2. The device of claim 1, wherein the storage compartment is coupled to the display screen.

3. The device of claim 1, wherein the display screen is movable between an open position, in which the display screen does not block access to the user control input, and a closed position in which the display screen blocks access to the user control input.

4. The device of claim 1, further comprising a male track and a female track, wherein the male track and female track are configured to removably couple the UAV within the storage cavity of the storage compartment.

5. The device of claim 1, wherein the UAV comprises a movable wing arm.

6. The device of claim 1, wherein the UAV comprises a stun gun.

7. The device of claim 1, wherein the UAV comprises an audio interface.

8. The device of claim 1, wherein the controller case comprises a power source, and wherein the power source comprises a charging outlet for communicating power to a power source of the UAV.

9. The device of claim 1, wherein the controller case comprises a power source, and wherein the power source is configured to provide wireless charging to a power source of the UAV.

10. A UAV controller device, the device comprising:
a control panel having a user control input;
a processing unit in communication with the control input;
a side wall coupled to a proximal wall and to a distal wall, the side wall, proximal wall, and distal wall forming a storage compartment, the storage compartment having a storage cavity for removably receiving a UAV, the UAV in wireless communication with the processing unit;
a display screen in communication with the processing unit, wherein the display screen is movable between an open position, in which the display screen does not block access to the user control input, and a closed position in which the display screen blocks access to the user control input; and
a camera, for recording video, coupled to the UAV, wherein video recorded by the camera is displayed on the display screen, and wherein the control input governs movement of the UAV.

11. The device of claim 10, further comprising an access cover, wherein the access cover is configured to govern access to the storage cavity of the storage compartment.

12. The device of claim 10, further comprising a male track and a female track, wherein the male track and female track are configured to removably couple the UAV within storage cavity of the storage compartment.

13. The device of claim 10, wherein the UAV comprises a movable wing arm.

14. The device of claim 10, further comprising a leg coupled to the distal wall for supporting distal wall above a surface.

15. The device of claim 10, further comprising a carrying strap.

16. The device of claim 10, wherein the UAV comprises a stun gun.

17. The device of claim 10, wherein the UAV comprises an audio interface.

18. The device of claim 10, wherein the controller case comprises a power source, and wherein the power source comprises a charging outlet for communicating power to a power source of the UAV.

19. The device of claim 10, wherein the controller case comprises a power source, and wherein the power source is configured to provide wireless charging to a power source of the UAV.

* * * * *